US012565237B2

(12) United States Patent
Ganguli et al.

(10) Patent No.: US 12,565,237 B2
(45) Date of Patent: Mar. 3, 2026

(54) OFF-BOARD PERCEPTION BASED ON SEQUENCE TO SEQUENCE SENSOR DATA GENERATION

(71) Applicant: PlusAI, Inc., Santa Clara, CA (US)

(72) Inventors: Anurag Ganguli, Saratoga, CA (US); Timothy Patrick Daly, Jr., San Jose, CA (US); Hao Zheng, Saratoga, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/901,743

(22) Filed: Sep. 30, 2024

(65) Prior Publication Data

US 2025/0116522 A1 Apr. 10, 2025

Related U.S. Application Data

(60) Provisional application No. 63/544,098, filed on Oct. 13, 2023, provisional application No. 63/542,462, filed on Oct. 4, 2023.

(51) Int. Cl.
*B60W 60/00* (2020.01)
*B60W 50/00* (2006.01)
(Continued)

(52) U.S. Cl.
CPC .... *B60W 60/0015* (2020.02); *B60W 50/0097* (2013.01); *G01C 21/30* (2013.01);
(Continued)

(58) Field of Classification Search
CPC ................................... G01C 21/30; G06N 3/08
(Continued)

(56) References Cited

U.S. PATENT DOCUMENTS

2020/0047751 A1 2/2020 Hwu et al.
2021/0016796 A1 1/2021 Matsushita et al.
(Continued)

FOREIGN PATENT DOCUMENTS

CN 116071711 A * 5/2023
WO WO-2018122804 A1 * 7/2018 ........... G08G 1/0112

OTHER PUBLICATIONS

Shams, "Google Maps now has live traffic alerts & alternate route suggestions" linkedin.com 2015 (Year: 2015).*

*Primary Examiner* — Tiffany P Young
*Assistant Examiner* — Shien Ming Chou
(74) *Attorney, Agent, or Firm* — Rimon Law, P.C.

(57) ABSTRACT

Methods, systems, and non-transitory computer readable media are configured to perform operations comprising capturing a first sequence of captured data associated with a first time window; generating a second sequence of generated data associated with a second time window based on the first sequence of data; identifying a difference between the second sequence of generated data and a ground truth sequence of captured data associated with the second time window; determining whether the difference between the second sequence of generated data and the ground truth sequence of captured data satisfies a selected threshold value; detecting a change associated with an environment when the difference between the second sequence of generated data and the ground truth sequence of captured data satisfies the selected threshold value; and based on the detected change, providing navigation guidance to a vehicle travelling in the environment.

20 Claims, 11 Drawing Sheets

(51) Int. Cl.
  *G01C 21/30*          (2006.01)
  *G06N 3/08*           (2023.01)

(52) U.S. Cl.
  CPC ......... *G06N 3/08* (2013.01); *B60W 2420/403*
      (2013.01); *B60W 2420/408* (2024.01); *B60W*
          *2554/4041* (2020.02); *B60W 2554/4042*
              (2020.02); *B60W 2554/4044* (2020.02)

(58) Field of Classification Search
  USPC ........................................................ 701/411
  See application file for complete search history.

(56)                    References Cited

U.S. PATENT DOCUMENTS

| | | | |
|---|---|---|---|
| 2022/0126864 A1 | 4/2022 | Moustafa et al. | |
| 2022/0289252 A1 | 9/2022 | Liu et al. | |
| 2022/0388536 A1 | 12/2022 | Kothbauer et al. | |
| 2023/0095384 A1 | 3/2023 | Sharma Banjade et al. | |
| 2023/0199449 A1 | 6/2023 | Katta et al. | |
| 2023/0360406 A1* | 11/2023 | Yu | G06T 7/73 |
| 2023/0394960 A1* | 12/2023 | Symes | G08G 1/0112 |
| 2023/0409881 A1* | 12/2023 | Heitzmann | B60T 8/174 |

* cited by examiner

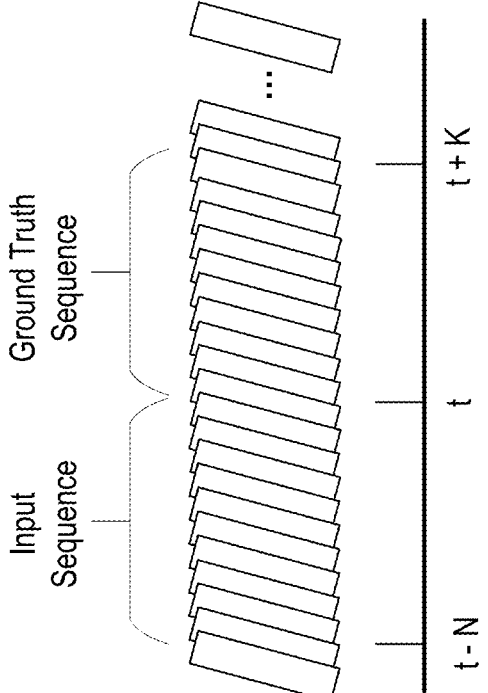
FIGURE 3A

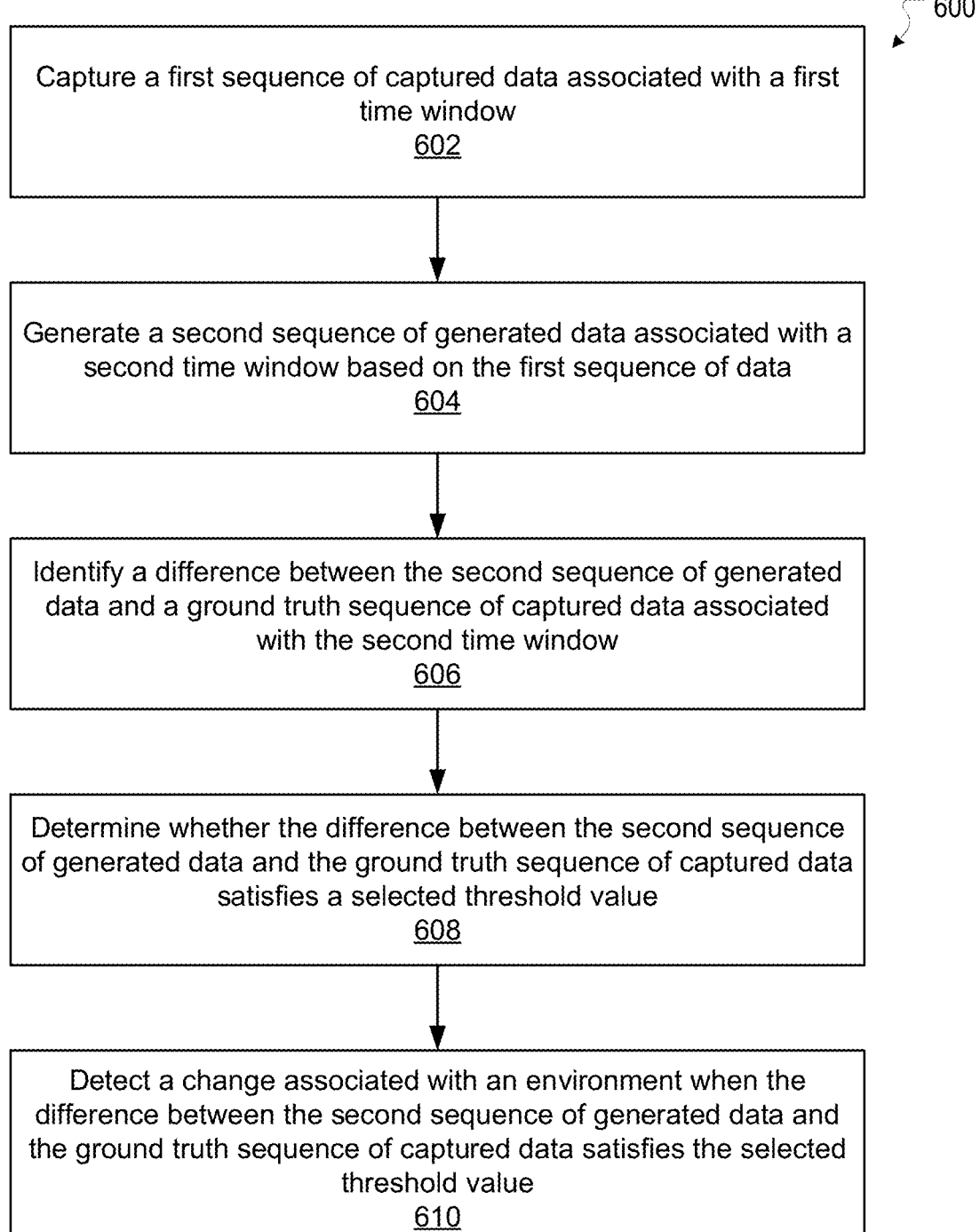

600

Capture a first sequence of captured data associated with a first time window
602

Generate a second sequence of generated data associated with a second time window based on the first sequence of data
604

Identify a difference between the second sequence of generated data and a ground truth sequence of captured data associated with the second time window
606

Determine whether the difference between the second sequence of generated data and the ground truth sequence of captured data satisfies a selected threshold value
608

Detect a change associated with an environment when the difference between the second sequence of generated data and the ground truth sequence of captured data satisfies the selected threshold value
610

FIGURE 6

Vehicle 700
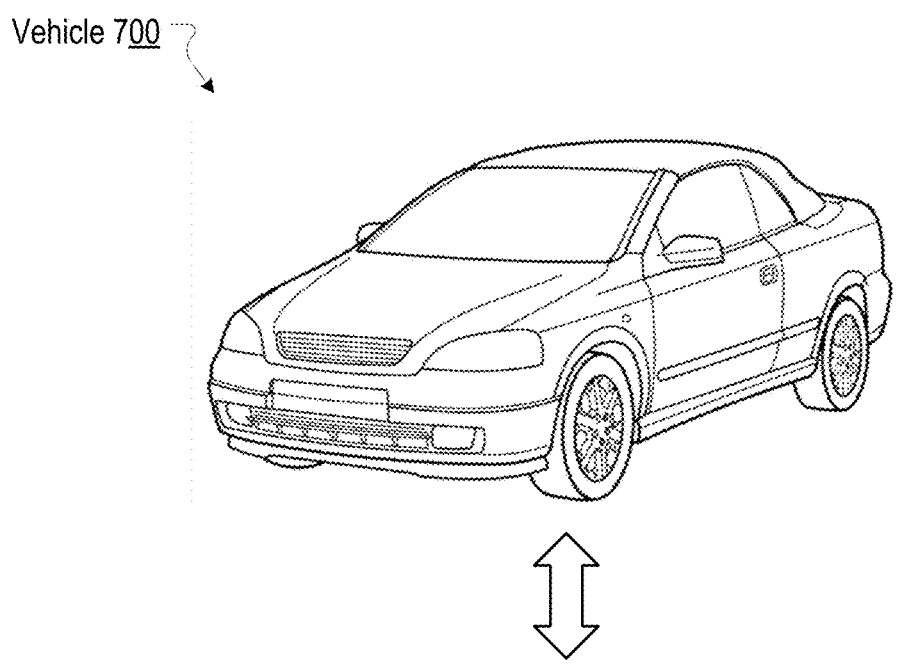
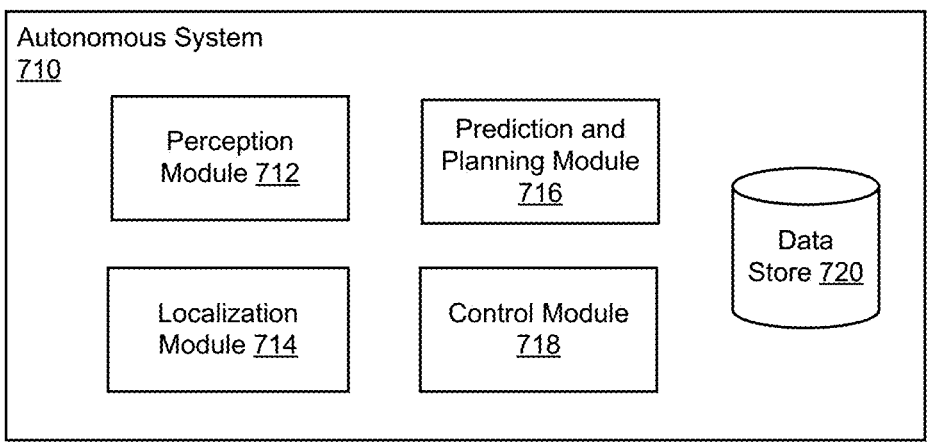
Autonomous System
710
Perception
Module 712
Prediction and
Planning Module
716
Data
Store 720
Localization
Module 714
Control Module
718
FIGURE 7

OFF-BOARD PERCEPTION BASED ON SEQUENCE TO SEQUENCE SENSOR DATA GENERATION

CROSS-REFERENCE TO RELATED APPLICATIONS

This application claims priority to U.S. Provisional Patent Application No. 63/542,462, filed on Oct. 4, 2023 and entitled "Infrastructure Off-Board Perception", and U.S. Provisional Patent Application No. 63/544,098, filed on Oct. 13, 2023 and entitled "Infrastructure Based Perception System", which are incorporated herein by reference in their entireties.

FIELD OF THE INVENTION

The present technology relates to vehicle systems. More particularly, the present technology relates to offboard infrastructure for real time anomaly detection to support navigation.

BACKGROUND

A navigation system of a vehicle can plan and control movement of the vehicle. Planning and control of vehicle movement by the navigation system can depend on an environment in which the vehicle is travelling. Data about the environment can include data about the presence, location, and potential movement of other vehicles and objects. Planning and control by the navigation system to achieve safe and efficient operation of the vehicle can depend on a reliable understanding of the environment. Such understanding of the environment should include changes in the environment.

SUMMARY

Various embodiments of the present technology can include methods, systems, and non-transitory computer readable media configured to perform operations comprising capturing a first sequence of captured data associated with a first time window; generating a second sequence of generated data associated with a second time window based on the first sequence of data; identifying a difference between the second sequence of generated data and a ground truth sequence of captured data associated with the second time window; and determining whether the difference between the second sequence of generated data and the ground truth sequence of captured data satisfies a selected threshold value.

In some embodiments, the ground truth sequence of captured data associated with the second time window follows the first sequence of captured data associated with the first time window in a sequence of sensor data capturing a segment of an environment for which an infrastructure system provides services.

In some embodiments, the operations further comprise: detecting a change associated with an environment when the difference between the second sequence of generated data and the ground truth sequence of captured data satisfies the selected threshold value.

In some embodiments, the operations further comprise: based on the detected change, providing navigation guidance to a vehicle travelling in the environment, the navigation guidance comprising at least one of i) a location of the detected change and ii) a suggestion to perform a navigation maneuver in response to the detected change.

In some embodiments, the detected change is an object or event associated with a frequency of appearance that is less than a selected threshold frequency value.

In some embodiments, the generating is performed by a sequence to sequence neural network.

In some embodiments, the operations further comprise: training the sequence to sequence neural network based on training data to remove an object or event from sequences of generated data outputted by the sequence to sequence neural network.

In some embodiments, the identifying is based on a difference map generated by a machine learning model that reflects differences associated with frame pairs from two sequences of data.

In some embodiments, the first sequence of captured data associated with the first window of time is a first number of frames of sensor data captured by an infrastructure system providing service to vehicles travelling in an environment, and the second sequence of generated data and the ground truth sequence of captured data are a second number of frames that is different from the first number of frames.

In some embodiments, the capturing is performed by an infrastructure pod of an infrastructure system that is substantially static relative to a segment of an environment associated with the infrastructure pod.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

BRIEF DESCRIPTION OF THE DRAWINGS

FIG. 3A illustrates an example simplified diagram of sensor data captured by an infrastructure pod of an infrastructure system, according to embodiments of the present technology.

FIG. 6 illustrates an example method, according to embodiments of the present technology.

FIG. 7 illustrates an example vehicle, according to embodiments of the present technology.

Figure 1:
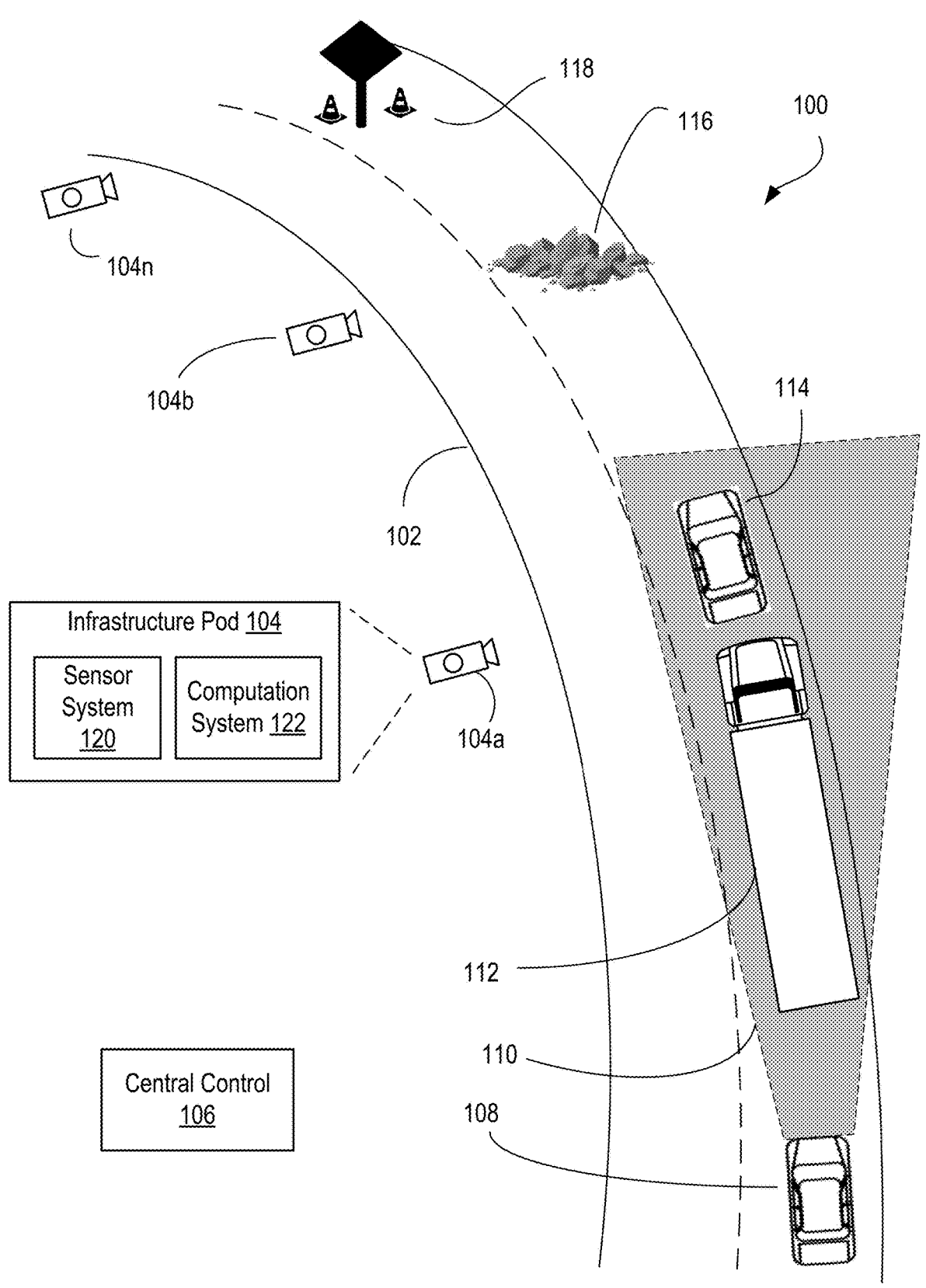
FIG. 1 illustrates an example infrastructure system including a change detection system, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

A navigation system of a vehicle can plan and control movement of the vehicle. Planning and control of vehicle movement by the navigation system can depend on an environment in which the vehicle is travelling. Data about the environment can include data about the presence, location, and potential movement of other vehicles and objects. Planning and control by the navigation system to achieve safe and efficient operation of the vehicle can depend on a reliable understanding of the environment. Such understanding of the environment should include changes in the environment.

Different techniques have been attempted to detect changes in an environment to inform vehicle navigation. One conventional technique to detect change in an environment for vehicle navigation can focus on identification of a background and a foreground in a series of images. The background and the foreground of a scene can be modeled separately. As distinguished from the foreground, the background can be any portion of a series of images that evolves relatively slowly. In contrast, the foreground, which can be indicative of change, can be any portion of a series of images that evolves relatively faster than the background. As just one example, one conventional technique can calculate changes in values of pixels in a series of images from which a threshold pixel value change can be determined. For instance, the threshold can be the median (or average) of the changes in pixel values. Based on the threshold, pixels in the images can be associated with the background or the foreground.

Conventional techniques to detect change in an environment of a vehicle pose many technological challenges and disadvantages. For example, objects of interest often can be incorrectly filtered out of a scene. Additionally, conventional techniques involving machine learning models can have difficulty identifying various types of changes, such as rare or uncommon changes on which a model has not been trained, quasi-static changes, and changes to dynamic objects which have been static for a long period of time. As another example, conventional approaches to change detection can be limited by the spatial resolution of onboard sensors, which may fail to detect certain objects of interest in an environment of the vehicle, especially small objects. Further, conventional approaches to change detection can be time and resource intensive. In this regard, large amounts of image data that span long periods of time can be required to train a model. The need for large amounts of image data can be especially pronounced for the detection of rare or uncommon changes. Additionally, the training of a model can rely on human annotation of large amounts of image data, which is time consuming and labor intensive.

The present technology provides improved approaches to detect changes including anomalies by an infrastructure system to improve vehicle navigation that overcome the aforementioned and other technological disadvantages. In various embodiments, the present technology can leverage an infrastructure system that is offboard. For example, the infrastructure system can be deployed for a road and provide services to vehicles on the road. The infrastructure system can constitute an independent, auxiliary sensing and perception system for a vehicle subscribed to the infrastructure system. The sensing and perception system of the infrastructure system can augment or complement preexisting onboard sensing and perception systems of the vehicle. The infrastructure system can include a plurality of pods, or infrastructure pods, positioned along or adjacent to the road. Each infrastructure pod can be dedicated to or otherwise associated with a corresponding segment of the road. The infrastructure system can include a central control associated with the infrastructure pods. Based on a suitable communications network, the infrastructure pods, the central control, and vehicles subscribed to the infrastructure system can communicate with one another to optimize vehicle navigation safety, efficiency, and comfort along the road.

An infrastructure pod can detect changes associated with a corresponding segment of the road that may not be detectable by the vehicles travelling on the segment or road. Detected changes can include anomalous objects and events. Each infrastructure pod can include a sensor system (e.g., cameras, radar, LiDAR, etc.) and a computation system. The infrastructure pod can acquire sensor data about the corresponding segment of the road. The sensor data can be provided to a change detection system of the computation system. In the change detection system, sensor data associated with a first time window can be acquired. A first sequence of captured frames associated with the first time window can be provided to a first model as an input sequence of captured frames. The first model can be a generative model (e.g., sequence to sequence neural network). Based on the input sequence of captured frames, the first model can generate a predicted output sequence of generated frames associated with a second time window that follows the first time window. The output sequence of generated frames can represent expected or predicted sensor data associated with the second time window based on the input sequence of captured frames. The output sequence of generated frames associated with the second time window can be provided to a second model, such as a machine learning model (e.g., neural network). In addition, a ground truth sequence of captured frames associated with the second time window can be acquired. The ground truth sequence of captured frames can be provided to the second model. The second model can determine differences between the output sequence and the ground truth sequence through pairwise frame comparisons. A difference between frames in a frame pair can indicate a detected change in a state or condition of the segment of the road.

The infrastructure system can determine navigation guidance for vehicles in the segment of the road or other vehicles impacted or potentially impacted by a detected change. For example, the navigation guidance can include the location of the detected change in relation to a map as well as other attributes of the detected change. As another example, the navigation guidance can include navigation advice to avoid or otherwise account for the detected change during navigation along the segment or other affected portions of the road. The navigation guidance can be transmitted to the vehicles in the segment of the road that are subscribed to the infrastructure system and impacted by the detected change. A vehicle that receives the navigation guidance from the infrastructure system can fuse the navigation guidance with data generated by an onboard sensor and perception system or utilize the navigation guidance to plan and control navigation. The navigation guidance also can be transmitted by the infrastructure system to vehicles in other segments of the road (e.g., segments with vehicles approaching the detected change) that are potentially impacted by the detected change so that the vehicles also can preemptively plan navigation based on the navigation guidance. These and other inventive features and related advantages of the various embodiments of the present technology are discussed in more detail herein.

FIG. 1 illustrates an example infrastructure system 100 including a change detection system, according to some embodiments of the present technology. FIG. 1 is illustrated for purposes of explanation and is not drawn to scale. The infrastructure system 100 can provide services for vehicles on a road 102 that are subscribed to the infrastructure system 100. The infrastructure system 100 can be an offboard system that is centralized or distributed. The infrastructure system 100 can include infrastructure pods 104 (infrastructure pod 104*a*, infrastructure pod 104*b*, . . . , infrastructure pod 104*n*) and a central control 106. A vehicle 108 on the road 102 can be subscribed to services offered by the infrastructure system 100. The services can include provision of data facilitating safe and efficient navigation of the road 102. Through provision of the data, the infrastructure system 100 can constitute a diverse redundant offboard sensing and perception system that can augment onboard sensing and perception systems installed on the vehicle 108, such as a perception module 712 and a localization module 714 of a system 710 of FIG. 7 as discussion in more detail herein. Although not shown to better illustrate features of the present technology, the infrastructure system 100 can include other infrastructure pods and other central controls and the road 102 can include other vehicles that are subscribed or not subscribed to services provided by the infrastructure system 100. The components (e.g., modules, elements, units, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the infrastructure system 100, the infrastructure pods 104, and the central control 106 can be implemented in or performed by any suitable combinations of the infrastructure system 100, the infrastructure pods 104, and the central control 106.

The vehicle 108 can be any type of vehicle that is capable of subscribing to services provided by the infrastructure system 100. Vehicles that can subscribe to the infrastructure system 100 can include passenger cars, vans, buses, trucks, motorcycles, mopeds, emergency vehicles, bicycles, scooters, and the like. The vehicles can include vehicles operable at various levels of autonomy or assistance (e.g., autonomous vehicles) as well as vehicles that are fully manually driven without any level of autonomy or assistance. As referenced herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the Society of Automotive Engineers (SAE) standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The road 102 can be a road of any type. The road 102 can be a street, roadway, expressway, highway, or a freeway in a metropolitan, urban, suburban, rural, or industrial environment. The road 102 can be of any length, such as 1 kilometer, 1 mile, 5 kilometers, 5 miles, 40 kilometers, 35 miles, etc. Portions of the road 102 can reflect any one or a combination of geometries, such as substantially straight, curved, windy, etc. Portions of the road 102 can be substantially flat, uphill, or downhill. The road 102 can support one way traffic or two way traffic. For each direction of traffic supported by the road 102, the road 102 can have any number of lanes, such as one lane, two lanes, three lanes, four lanes, five lanes, etc. The lanes of the road 102 can include, for example, basic lanes, carpool lanes, emergency lanes, merge lanes, on ramps, off ramps, etc. The road 102 can have a shoulder or other non-driving surface or section on each side of the road 102. The road 102 can have a middle divider or other section separating two directions of traffic.

The infrastructure pods 104 can be positioned at various locations on, along, above, or below the road 102. As discussed in more detail herein, an infrastructure pod 104 can capture and process data associated with a corresponding segment of the road 102. The infrastructure pod 104 also can receive data from other sources of the infrastructure system 100, as discussed in more detail herein. A sensor system of each infrastructure pod 104 can be oriented or directed toward the road 102 so that the field of view of the infrastructure pod 104 can encompass a corresponding segment of the road 102 that is associated with the infrastructure pod 104. As indicated, for purposes of clear illustration, the road 102 and distribution of infrastructure pods 104 along the road 102 are not necessarily drawn to scale. The infrastructure pods 104 can be separated or distributed along the road 102 so that the infrastructure pods 104 can collectively and comprehensively monitor and capture data relating to the full extent of the road 102. In this regard, the infrastructure pods 104 can be located along the road 102 so that no portion of the road 102 is not monitored by an infrastructure pod 104. In some embodiments, the location of infrastructure pods 104 can be based on the availability of or access to a power source for powering the infrastructure pods 104. For example, the infrastructure pods 104 can be positioned for optimal receipt of sunlight when they are configured to run on solar power. In some embodiments, for a portion or entirety of the road 102, the infrastructure pods 104 can be separated by a predetermined distance as measured, for example, longitudinally in relation to the geometry of the road 102. For example, when the road 102 is substantially straight, the infrastructure pods 104 can be separated by a uniform or constant distance. The distance can be any suitable value (e.g., 100 meters, 250 meters, 500 meters, 1 kilometer, etc.). In some instances, for a portion or entirety of the road 102, the infrastructure pods 104 can be separated by smaller or variable distances to ensure adequate capture of data to account for special considerations. For example, if occlusions or obstructions (e.g., trees, bridges, overpasses, billboards, signs, etc.) on or near a portion of the road 102 interfere with or otherwise limit the field of view of an infrastructure pod 104, a larger number or density of infrastructure pods 104 can be deployed at or near the portion of the road 102 in comparison to other portions of the road 102 to ensure adequate data capture for the portion of the road 102. As another example, if a portion of the road 102 is associated with a higher level of risk (e.g., intersections, on ramps, winding roadway, blind curves, etc.), a larger number or density of infrastructure pods 104 can be deployed at or near the portion of the road 102 in comparison to other portions of the road 102 to capture more data and potentially reduce risk. As yet another example, if a portion of the road 102 is windy or curved to a significant degree, a larger number or density of infrastructure pods 104 can be deployed at or near the portion of the road 102 in comparison to other portions of the road 102 to account for road geometry. In some embodiments, relatively higher performance sensor systems can be utilized in infrastructure pods 104 associated with some portions of the road 102 while relatively lower performance sensor systems can be utilized in infrastructure pods 104 associated with other portions of the road 102. For example, the relatively higher performance sensor systems can be utilized in portions of the road 102 that pose elevated risk.

The infrastructure pods 104 can be static in relation to the road 102. In some embodiments, the infrastructure pods 104 can be mounted on or otherwise supported by structures (not shown). The structures can be situated along or near the road 102 to achieve desired distribution distances between infrastructure pods 104. The structures can be positioned on or in proximity to the road 102 through a variety of manners. For example, the structures can be secured to or in the road 102 or the ground adjacent to the road 102, such as on road shoulders or a middle divider. As another example, the structures can be disposed on preexisting structures or other assemblies (e.g., signs, posts, etc.) along the road 102. The structures can embody any configuration or shape suitable to carry or support the infrastructure pods 104. For example, the structures can be substantially straight or curved. A structure can include or be attached to mounts, platforms, or other supports on which to dispose an infrastructure pod 104. An infrastructure pod 104 can be attached to a structure at any suitable height (e.g., 10 meters, 20 meters, 25 meters, etc.) to optimize full capture of data reflecting all objects and events on the corresponding segment of the road 102. In some embodiments, the infrastructure pods 104 can be carried by or in mobile or aerial drones. For example, a drone including an infrastructure pod 104 can be navigated on the road 102 to assume a fixed (or stationary) position having a predetermined pose or orientation in relation to the road 102. From the fixed position, the drone can capture sensor data about the corresponding segment of the road. As another example, a drone including an infrastructure pod 104 can aerially navigate to and remain fixed at a predetermined point in the air in proximity to the road 102. From the fixed point in the air, the drone can assume a predetermined orientation to capture sensor data about the segment of the road 102.

In some embodiments, the infrastructure pods 104 can be positioned at different heights or with different orientations from one another to account for special features or variations along the road 102, account for different capabilities of different sensor systems in the infrastructure pods 104, and otherwise optimize data capture relating to the road 102. The fixed, stationary position of an infrastructure pod 104 in relation to the road 102 can enable the capture of sensor data relating to the segment of the road 102 that is more accurate, reliable, and otherwise actionable than the capture of data by moving sensors disposed on, for example, a vehicle travelling in the segment or the road. In addition, the infrastructure pod 104 can capture sensor data relating to the segment of the road that is beyond the field of view of or otherwise not capable of being captured by sensors on vehicles travelling in the segment.

An infrastructure pod 104, such as the infrastructure pod 104a, can be an edge device in a mesh network of edge devices in the form of infrastructure pods capable of low latency computation and transfer of information. The infrastructure pod 104 can include a sensor system 120 and a computation system 122 that function in real time (or near real time). In some embodiments, the sensor system 120 and the computation system 122 can be separate modular devices that are physically or communicatively coupled with one another. In some embodiments, the sensor system 120 and the computation system 122 can be integrated as a single device constituting the infrastructure pod 104. In some embodiments, the sensor system 120 and the computation system 122 can be dedicated to the infrastructure pod 104. In some embodiments, the sensor system 120 or the computation system 122, or both, can be shared between the infrastructure pod 104a and one or more other infrastructure pods 104b-n. For purposes of illustration, the design and operation of one infrastructure pod 104a is described herein as an example that also applies to describe the design and operation of the other infrastructure pods 104b-n in the infrastructure system 100.

The sensor system 120 can capture sensor data regarding a road, or an associated segment thereof, and its surroundings. Sensors of the sensor system 120 can be oriented or otherwise directed to have a field of view or other sensory scope to monitor an environment (e.g., area, space) in which the segment of the road associated with the infrastructure pod 104 is included. The environment monitored by the sensor system 120 can include the segment of the road associated with the infrastructure pod 104 as well as a selected amount of area or space above, around, and below the segment. In some embodiments, the environment associated with the segment and monitored by the sensor system 120 can overlap a selected amount with an environment associated with an adjoining segment and monitored by a sensor system of another infrastructure pod. The sensor system 120 can include any types of sensors suitable for capturing sensor data about the environment associated with the segment corresponding to the infrastructure pod 104. The sensors in the sensor system 120 can include any numbers, combinations, and types of cameras, radar, LiDAR, or other types of sensors. For example, the cameras can include cameras with various focal lengths and resolutions; mono (monocular) cameras and stereo (stereoscopic) camera pairs; and infrared cameras. Likewise, the sensor system 120 can include various types of radar (e.g., short range, medium range, long range, continuous wave, pulse, etc.) and LIDAR (e.g., mechanical scanning, solid state, 2D, 3D, 4D, etc.). In some instances, the sensor system 120 and the computation system 122, or components thereof, are not utilized by or installed on the vehicles travelling on the road. For example, the sensor system 120 and the computation system 122 can include types of sensor technologies or computing components that will be developed in the future that are newer, more advanced than sensor technologies or computing components onboard vehicles. As newer, more advanced types of sensors and computation systems are developed, they can be advantageously incorporated by the infrastructure system 100 and included in the infrastructure pod 104 in contrast to onboard sensor systems installed in vehicles that can be limited to only the preexisting (old) types of sensors and computation system with which the vehicles were manufactured. Accordingly, the infrastructure system 100 can provide or constitute an independent sensing and perception system for vehicles on the road that can be superior to onboard systems installed on the vehicles themselves.

The computation system 122 can perform various operations based on the sensor data captured by the sensor system 120. The computation system 122 can include, for example, a perception module and a communications module. Based on the sensor data, the perception module can recognize objects in an environment associated with a corresponding segment of a road. In addition, the perception module can recognize the occurrence of events or scenarios in the environment. Objects can include vehicles as well as any types of objects. Vehicles can include any type of vehicle, including vehicles that are subscribed to services provided by the infrastructure system 100 as well as vehicles not so subscribed. Objects can include, for example, obstructions, hazards, debris, persons, animals, road works, construction zones, signs, etc. Events can include accidents, vehicle movements, traffic flow, lane or road closures, weather events (e.g., rain, snow, hail, wind, etc.), emergency events (e.g., emergency vehicle presence), malfunctioning road lights, and the like.

The perception module can recognize objects and events based on various computer vision or machine learning techniques. For example, a machine learning model can be trained to recognize objects and events based on sensor data. The machine learning model can be trained with training data that includes instances of sensor data representing or depicting various objects and events. The sensor data can include, for example, labels (e.g., class labels) that identify or classify objects and events in the sensor data. The sensor data can be annotated to indicate locations (e.g., x, y coordinates, bounding boxes) or pixel positions of objects and events in the sensor data. Based on the training data, the machine learning model can be trained to label recognized objects and events with appropriate classifications. In addition, the machine learning model can be trained to generate, for example, bounding boxes to indicate locations of the objects and the events in the sensor data.

Based on the sensor data, the perception module can generate various types of perception data. For example, perception data can include identifications, or classifications, of objects and events. In addition, the perception data can include values relating to, as applicable, the position, heading (direction), speed, and other attributes of objects represented in the sensor data. The values determined by the perception module can be absolute values or relative values. For example, the position of objects can be provided by the perception module as absolute position data (e.g., GPS coordinates). In other examples, the position of the objects can be determined by the perception module as relative position data, such as location data that is specified in relation to a maintained map, predetermined object (or marker), or coordinate system.

In addition, the perception module can include a change detection system in accordance with the present technology. As discussed in more detail herein, based on sensor data, the change detection system can detect in real time (or near real time) the presence of changes in a state or condition of an environment, such as a road or a segment thereof. The detected change can relate to the presence (or absence) of an object or event associated with the segment of the road. The detected change can include an anomalous object or event that is rare or uncommon. Anomalous objects and events can include any type of object or event that does not normally, frequently, or appropriately occur in relation to a road or segment thereof. For instance, an anomalous object or event can be debris (e.g., rocks, litter, mattress, ladder, etc.), a wandering animal, road damage, erratic vehicle motion, road construction, an accident, and the like. A change detected by the change detection system can be not otherwise detectable by machine learning models trained to recognize objects or events. In some embodiments, the change detection system can supplement or complement other machine learning models trained to recognize objects or events. More details regarding the change detection system are set forth herein.

The communications module can provide in real time (or near real time) infrastructure data to vehicles that are subscribed to services provided by the infrastructure system 100. The infrastructure data can include navigation guidance for the vehicles. The navigation guidance can include information about the presence or occurrence of detected changes in relation to a segment of a road that could potentially impact navigation of vehicles. In addition, the navigation guidance can include suggested action tailored to each vehicle to allow the vehicle to appropriately respond to a detected change. The navigation guidance can be received and utilized by the vehicles to enhance the ability of the vehicles to safely and effectively navigate the road.

For example, the infrastructure pod 104a can communicate with the vehicle 108. The infrastructure pod 104a can be associated with a segment of the road 102 in which the vehicle 108 is currently positioned. As discussed, the infrastructure pod 104a can include a sensor system 120 that captures sensor data about objects and events that are present or occurring on or near the segment of the road 102. The infrastructure pod 104a can receive similar or other types of data from other infrastructure pods 104b-n or the central control 106. The infrastructure pod 104a can provide various types of data, including data regarding the objects and events occurring on or near the associated segment and data from other infrastructure pods 104b-n and the central control 106, in real time (or near real time) to the vehicle 108 and other vehicles in the segment. The infrastructure pod 104a can provide the data at one or more suitable frequencies (e.g., five times per second, ten times per second, 100 times per second, etc.). As discussed in more detail herein, the data provided by the infrastructure pod 104a to the vehicle 108 can augment data generated by one or more preexisting onboard systems of the vehicle 108 to enhance the safety and performance of the vehicle 108. In some embodiments, the vehicle 108 can provide to the infrastructure pod 104a data generated or determined by an onboard sensing and perception system of the vehicle 108, and the infrastructure pod 104a can provide the data to other vehicles in the segment, other infrastructure pods 104b-n, or the central control 106.

In some embodiments, the vehicle 108 can communicate with additional infrastructure pods 104b-n that are not associated with the segment of the road 102 in which the vehicle 108 is positioned. For example, when communication between the vehicle 108 and the infrastructure system 100 is desired, the vehicle 108 can be directed to communicate with the infrastructure pod 104a because the infrastructure pod 104a is associated with a segment of the road 102 on which the vehicle 108 is travelling. In some instances, if the infrastructure pod 104a associated with the segment of the road 102 on which the vehicle 108 is travelling is unable to conduct communications with the vehicle 108, another infrastructure pod associated with another segment of the road 102 or another infrastructure pod that is next closest to the vehicle 108 can conduct communications with the vehicle 108.

The infrastructure pods 104 can communicate with one another. In some embodiments, each infrastructure pod 104 can communicate with all of the other infrastructure pods 104 of the infrastructure system 100. In some embodiments, an infrastructure pod 104 can communicate with a portion of all other infrastructure pods 104 of the infrastructure system 100. For instance, based on predetermined rules, the infrastructure pod 104a can communicate only with other infrastructure pods that are positioned within a threshold distance (e.g., transmission range of the infrastructure pod 104a) from the infrastructure pod 104a. In another instance, the infrastructure pod 104a can communicate with a predetermined number (e.g., 2) of other infrastructure pods that are positioned nearest to the infrastructure pod 104a. The infrastructure pod 104a can communicate with other infrastructure pods to provide data informing the other infrastructure pods about detected objects and detected events associated with the corresponding segment of the road 102 that may impact navigation in segments of the road 102 corresponding to the other infrastructure pods. Upon receipt of the data, the other infrastructure pods, in turn, can convey the data to vehicles located within associated segments of the other infrastructure pods so that the vehicles can take appropriate proactive navigation measures in response to the objects and events.

The central control 106 can communicate with the infrastructure pods 104 and vehicles subscribed to services of the infrastructure system 100, including the vehicle 108. In some embodiments, the infrastructure system 100 can include one central control 106, and the central control 106 can function as the central control hub for all of the infrastructure pods associated with the entirety of a road 102. In some embodiments, the infrastructure system 100 can include a plurality of central controls, and the central control 106 can function as a central control hub for infrastructure pods associated with a portion of a road 102.

The central control 106 can acquire various types of data. The acquired data can include information provided by the infrastructure pods 104 and the vehicles on the road 102, including the vehicle 108. The acquired data also can include, as warranted, information from other central controls associated with other portions of the road 102 or other roads. The acquired data also can include information from third party sources and databases. The third party sources and databases can include weather services, news outlets, road services, emergency response organizations, governmental agencies, and the like that are accessible through, for example, APIs that support communications feeds.

Based on the acquired data, the central control 106 can determine various types of data relevant to road navigation and provide (directly or indirectly) the data to the infrastructure pods 104 and to the vehicles on the road 102 that are subscribed to the infrastructure system 100, including the vehicle 108. The types of data determined by the central control 106 can include data that has been generated by resources of the central control 106. The resources can include, for example, human operators, transportation analysts, computing systems, artificial intelligence and machine learning models, and the like. The data determined by the central control 106 can include, for example, navigation guidance (e.g., advice, information) for vehicles on the road 102. The navigation guidance can include, for example, indications about current or upcoming hazards (e.g., accidents, debris, persons, animals, road curves, malfunctioning infrastructure pods, occluded or damaged road signage, etc.); alerts about emergency events (e.g., approaching emergency vehicles); suggestions to speed up, slow down, change lanes, exit, etc.; information about lane availability; information about alternate routes; warnings relating to road works, construction zones, lane or road closures, weather events (e.g., rain, snow, hail, etc.); and the like. In some embodiments, data determined by the central control 106 can be selectively provided to all of the infrastructure pods 104 or a subset of the infrastructure pods 104. In some embodiments, data determined by the central control 106 can be selectively provided to all of the vehicles on a road 102 (or portion thereof) associated with the central control 106 or a subset of the vehicles. For example, if the central control 106 detects that dangerous road debris has appeared on a segment of the road 102, the central control 106 can provide an alert about the road debris to the infrastructure pods 104 having vehicles potentially impacted by the road debris. In this example, the infrastructure pods 104, in turn, can provide the alert to the vehicles positioned in the corresponding segments. Alternatively, the central control 106 can provide alerts directly to the vehicles subscribed to the infrastructure system 100. The foregoing are merely illustrations and many variations are possible. In some embodiments, the central control 106 can communicate data to other central controls of the infrastructure system 100 or other entities separate from the infrastructure system 100 (e.g., public safety authorities, governmental bodies, members of the public, subscribers of the infrastructure system, etc.) to apprise the other central controls or entities about real time road conditions.

A communications network can be supported by the infrastructure system. The communications network can be implemented in a variety of manners. In some embodiments, the communications network can support wireless communications among the vehicles subscribed to the infrastructure system 100 (e.g., the vehicle 108), the infrastructure pods 104, and the central control 106. In some embodiments, a communications network can support wireless communications between the vehicles and the infrastructure pods 104 and between the vehicles and the central control 106. In some embodiments, a communications network can support wireless or wired communications between the infrastructure pods 104 and the central control 106. In some embodiments, a latency requirement can be determined for the infrastructure system 100 that enables timely communications supportive of enhanced vehicle safety and performance along the road 102. The infrastructure system 100 can adopt a communications network that implements one or more selected communications protocols that satisfy the latency requirement. The latency requirement can be based in part on the amount of time within which detected objects and detected events relating to the road 102 must be timely communicated to infrastructure pods 104 and vehicles so that the vehicles can take safe, efficient, and otherwise appropriate action in response to the objects and the events. Selection of the communications protocol can depend on various attributes of the communications protocol, such as data transfer rate, range, power consumption, cost, robustness, functional safety, and security. In some instances, the infrastructure system 100 can support a communications network that implements a communications protocol for all communications in the infrastructure system 100 or different communications protocols based on the types of communicating entities, such as communications between an infrastructure pod and a vehicle versus communications between an infrastructure pod and the central control. In some instances, the infrastructure system 100 can support a communications network that implements one or more of cellular, Wi-Fi, dedicated short-range communications (DSRC), or other type of high assurance communications protocol or link (e.g., Bluetooth, Li-Fi, etc.).

As shown in FIG. 1, a field of view 110 of the vehicle 108 is limited or blocked by a vehicle 112 travelling on the road 102 in front of the vehicle 108. As a result, a vehicle 114 that is travelling on the road 102 in front of the vehicle 112 cannot be perceived by sensor systems of the vehicle 108. Further, the field of view 110 of the vehicle 108 does not extend to reach objects or events that are a significant distance in front of the vehicle 108 on the road 102, such as a road hazard 116 and road construction activity 118. The infrastructure system 100 including the infrastructure pods 104 can detect the presence and determine the locations of the vehicle 114, the road hazard 116, and the road construction activity 118 even when the vehicle 108 cannot. As discussed in more detail herein, the infrastructure system 100 in accordance with the present technology can utilize a change detection system to detect in real time (or near real time) the presence of the vehicle 114, the road hazard 116, the road construction activity 118, and other objects and events, including anomalous objects or events, that are occurring on or around the road 102. The change detection system also can provide navigation guidance to the vehicle 108 to enable the vehicle 108 to take appropriate responsive action based on the detected objects and events.

The design and operation of the infrastructure system 100, including the infrastructure pods 104 and the central control 106, in relation to the vehicle 108 have been described for purposes of illustration. The design and operation of other infrastructure pods and other central controls in the infrastructure system 100 in relation to other vehicles can be as described for the infrastructure pods 104 and the central control 106. For example, the design and operation of the infrastructure pod 104a as described can apply to each of the other infrastructure pods 104b-n.

Figure 2:
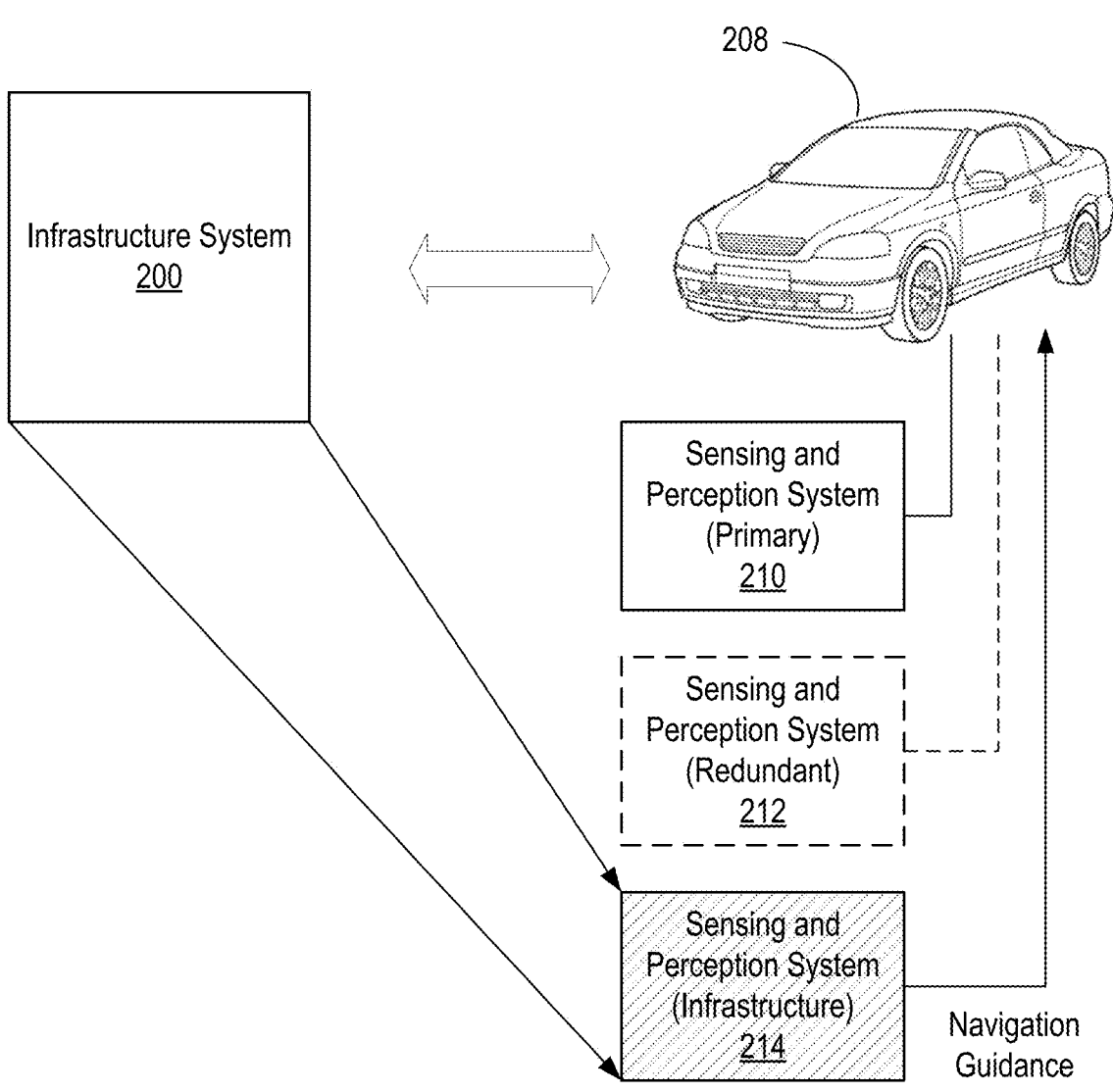
FIG. 2 illustrates an example simplified functional block diagram of an infrastructure system to augment vehicle capabilities, according to embodiments of the present technology.

FIG. 2 illustrates an example simplified functional block diagram of an infrastructure system 200 to augment vehicle capabilities, according to some embodiments of the present technology. In some embodiments, the infrastructure system 200 can be the infrastructure system 100. A vehicle 208 that is travelling on a road serviced by the infrastructure system 200 can include an onboard sensing and perception system 210 that is primary. In some embodiments, the vehicle 208 can include an onboard sensing and perception system 212 that is secondary or redundant. The infrastructure system 200 can include an offboard sensing and perception system 214 that includes a change detection system. The offboard sensing and perception system 214 can be utilized for the vehicle 208 to augment the onboard sensing and perception system 210 and, when present, the onboard sensing and perception system 212. In particular, the infrastructure system 200 can provide to the vehicle 208 various types of infrastructure data, including navigation guidance generated by the change detection system. The navigation guidance can include information relating to detected changes associated with a status or condition of a segment of the road in which the vehicle 208 is or will be travelling. The detected changes can include the occurrence of anomalous objects or events that are not detectable by the vehicle 208. The navigation guidance can include information relating to the locations of detected objects or events as well as suggestions for the vehicle 208 to perform navigation maneuvers in response to the detected objects or events. The navigation guidance can supplement or be fused with the data generated by the onboard sensing and perception system 210 and, when present, the onboard sensing and perception system 212 to optimize navigation of the vehicle 208. Accordingly, the navigation guidance generated by the change detection system of the infrastructure system 200 can support improvements to the safety and performance of the vehicle 208. For example, based on receipt of navigation guidance from the infrastructure system 200 indicating the sudden occurrence of an obstruction on the road and the location of the obstruction, the vehicle 208 can determine a safe course of action (e.g., change lanes, stop vehicle, slow vehicle, maintain current lane, exit road, etc.) to navigate the vehicle 208 to avoid the obstruction.

FIG. 3A illustrates an example simplified diagram of sensor data 300 captured by an infrastructure pod of an infrastructure system, according to some embodiments of the present technology. The sensor data 300 is illustrated as a sequence of frames. A time t is specified along with an earlier time t–N and a later time t+K, where N and K can be any real values of time. A time duration between t–N and t can be a first time window during which a first sequence of frames are captured by an infrastructure pod. A time duration between t and t+K can be a second time window during which a second sequence of frames are captured by the infrastructure pod. As discussed in more detail herein, the first sequence of frames can constitute an input sequence of frames to be provided to a first stage of a change detection system. The second sequence of frames can constitute a ground truth sequence of frames. The ground truth sequence of frames can be provided to a second stage of the change detection system. The frames can be or include any types of sensor data. In some embodiments, the types of sensor data can include any one or combination of, for example, image data, radar data, and LiDAR data.

In some embodiments, the first sequence of frames and the second sequence of frames can be all or a portion of frames captured by the infrastructure pod during, respectively, the first time window and the second time window. For example, the first sequence of frames and the second sequence of frames can be every frame, every other frame, every third frame, and so on captured by the infrastructure pod during, respectively, the first time window and the second time window. As another example, the first sequence of frames and the second sequence of frames can be every frame per predetermined time period (e.g., every frame per 10 milliseconds, every frame per 100 milliseconds, etc.) captured by the infrastructure pod during, respectively, the first time window and the second time window.

Figure 3B:
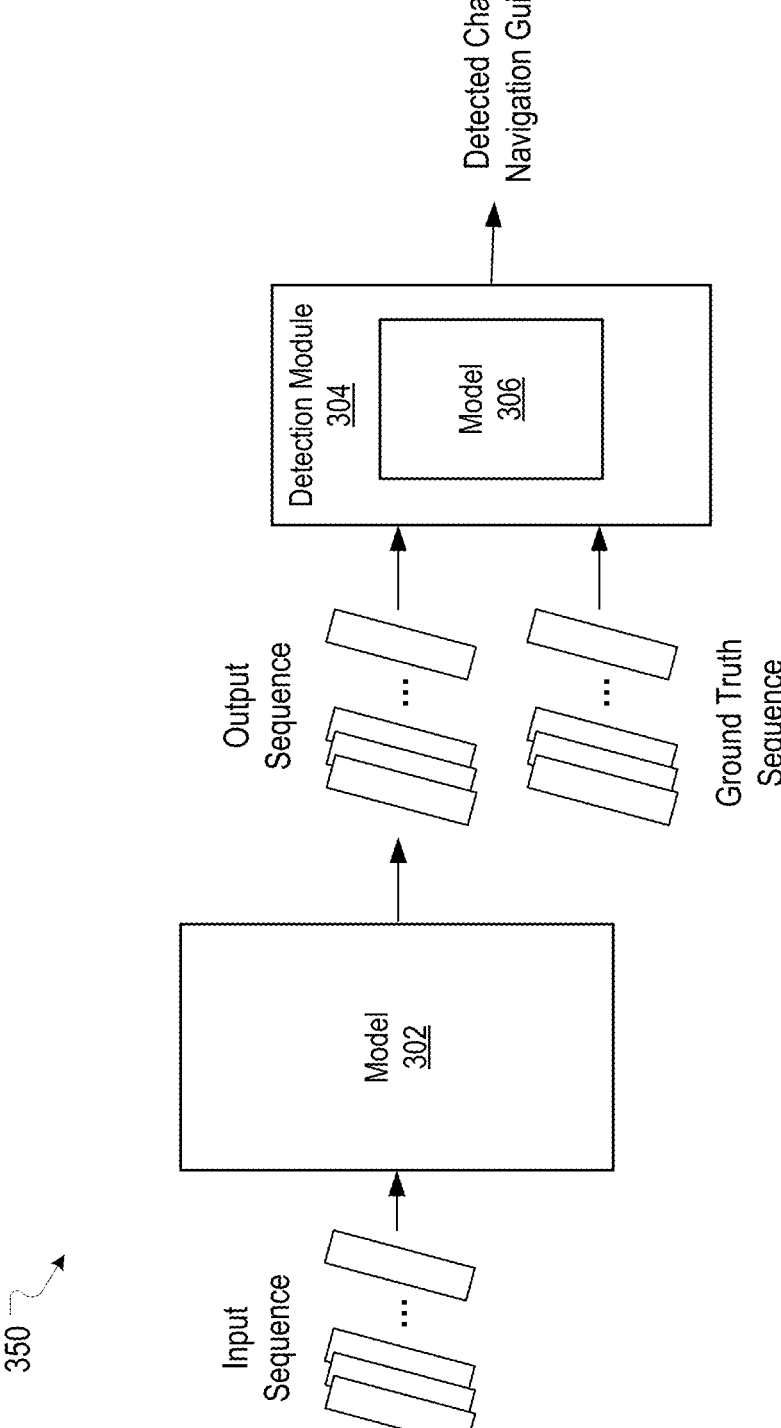
FIG. 3B illustrates an example simplified functional block diagram of a change detection system of an infrastructure system, according to embodiments of the present technology

FIG. 3B illustrates an example simplified functional block diagram of a change detection system 350 of an infrastructure system, according to some embodiments of the present technology. In a first stage of the change detection system 350, an input sequence of frames of sensor data can be provided to a model 302. The input sequence of frames can be captured by an infrastructure pod during a first time window, as discussed. The model 302 can be, for example, a generative (deep learning) or foundation machine learning model. As one example, the model 302 can be a neural network (e.g., recurrent neural network), such as a sequence to sequence (seq2seq) neural network. Based on the provision of the input sequence of frames to the model 302, the model 302 can generate an output sequence of frames. The model 302 can generate the output sequence of frames as a prediction of frames to follow the input sequence of frames. The output sequence of frames can represent a prediction of the state or condition of the segment of the road in a second time window that immediately follows the state or condition of the segment of the road in a first time window associated with the input sequence. The model 302 can be configured to output a number of frames (or length) of the output sequence that is suitable for a particular implementation of the change detection system 350.

The model 302 can be trained based on suitable training data to generate a predicted second sequence of frames that follows a captured first sequence of frames. The training data can include sequences of frames that can depict or describe various environments or conditions relating to different segments of roads. In some instances, the training data can describe or reflect segments of roads having attributes (e.g., geometry, lane numbers, lane markings, on-ramps, off-ramps, road signs, appearance, elevation, etc.) that are similar to attributes of segments of roads serviced by the infrastructure system. The sequences of frames can include real data captured by sensors, generated data simulating real data, or a combination thereof. The sequences of frames can include various types of sensor data, such as image data, radar data, and LiDAR data.

The training data can include input-output pairs based on sequences of frames of sensor data. The sequences of frames can be divided into input sequences and output sequences constituting input-output pairs. A sequence of frames can be divided to achieve any suitable or desired number (or length) of frames of an input sequence and an output sequence. The length of the input sequence and the length of the output sequence can be any number of frames (or any amount of time) that is desirable or suitable for a particular implementation. For example, the input sequence or output sequence can have 5 frames, 10 frames, 50 frames, 150 frames, etc. As another example, given a frame rate (e.g., fps) associated with a particular sensor, the input sequence or output sequence can be 0.5 seconds, 1 second, two seconds, five seconds, etc. In some embodiments, the number of frames in the input sequence can be the same as the number of frames in the output sequence. In some embodiments, the number of frames in the input sequence can be more than or less than the number of frames in the output sequence. In some embodiments, a ratio of the number of frames in the output sequence over the number of frames of the input sequence can be determined to equal a selected value or determined to not exceed a selected threshold value. In some embodiments, the number of frames in the input sequence can be determined based on a desired confidence level in the associated output sequence. In some embodiments, input-output pairs are, respectively, input sequences of frames and output sequences of frames selected to have different or varying numbers of frames to train the model 302 to exhibit robustness during a generation phase in producing accurate output sequences of varying lengths based on input sequences of varying lengths. Many variations are possible.

In some embodiments, the model 302 also can be trained based on suitable training data to cause the model 302 to remove objects or events from output sequences of frames generated by the model 302. The objects or events to be removed can be any objects or events suitable or desirable for removal in a particular implementation. For example, the objects or events to be removed can be all objects and events on or near a road except for the road and vehicles travelling on the road. As another example, the objects or events can be any objects or events whose appearance on the road is uncommon based on a predefined measure or standard. For instance, an object or event whose appearance on the road is uncommon can be associated with a frequency of appearance on roads or in frames of sensor data capturing roads that is less than a selected threshold frequency value (e.g., number of instances over road distance, number of instances over number of frames of sensor data, etc.). The foregoing are merely examples, and many variations are possible. Depending on the selected threshold frequency value, an object or event whose appearance on the road that is uncommon can include, for example, debris, an animal, erratic vehicle movement, an accident, a pothole, a faded or absent lane marking, extreme weather conditions, uncommon traffic motion, etc.

A variety of techniques can be utilized to remove objects or events from output sequences of frames generated by the model 302. For example, in one technique relating to training data augmentation, original sequences of frames depicting a road can be obtained. The sequence of frames can be actual sensor data, simulated sensor data, or a combination of both. The sequence of frames can be modified or augmented to add or overlay a representation or depiction of an uncommon object or event into the sequence of frames to generate an augmented sequence of frames. For example, augmentation of a sequence of frames can be a pixelwise addition of representations of the object or event to selected locations in the frames in the sequence. In addition, the sequence of frames can be augmented based on the addition of pixels (or pixel groups) having varied or random appearances and locations to the sequence of frames. The training data can train the model 302 to remove an open class of uncommon objects and events in sensor data even if the objects or events are not precisely included in the training data. Training data to train the model 302 to remove objects or events can include input-output pairs in which an input is an augmented sequence of frames depicting an object, event, or other pixels to be removed and the output is a sequence of frames that does not depict the object, event, or other pixels. Based on the training data, the model 302 can generate output sequences of frames without uncommon objects and events so that the output sequences can exhibit differences from ground truth sequences reflecting the uncommon objects and events. The differences can facilitate detection of the uncommon objects and events.

In a second stage of the change detection system 350, the output sequence of frames generated by the model 302 can be provided to a model 306 of a detection module 304. A ground truth sequence of frames captured by the infrastructure pod during the second time window, which follows the input sequence of frames captured during the first time window, also can be provided to the model 306. The number of frames of the output sequence and the number of frames of the ground truth sequence can be the same number. The model 306 can be a machine learning model. The model 306 can be a neural network, such as a convolutional neural network (CNN). The model 306 can perform comparisons of frame pairs from the output sequence and the ground truth sequence (e.g., frames having the same or closest time stamps). The model 306 can determine the existence of differences between the frames of the output sequence and the ground truth sequence. For example, the model 306 can extract relevant features from both frames and capture differences in texture, color, or shape. The model 306 can output a difference map, such as a heatmap. The difference map can indicate differences in pixel data between a corresponding pair of frames. For example, a difference map can visually represent divergence by using color or grayscale to indicate degrees of similarity or dissimilarity.

The model 306 can be trained based on suitable training data to generate a difference map for pairs of frames in sequences of frames. In the training data, a first sequence of frames of sensor data and a second sequence of frames of sensor data can depict or describe a state or condition of a common segment of a road. The first sequence of frames and the second sequence of frames can include real data captured by sensors, generated data simulating real data, or a combination thereof. A pair of a frame of the first sequence and a corresponding frame of the second sequence can be determined. A difference map based on the frame pair can be generated and annotated to indicate difference regions associated with the frame pair. The annotations can reflect a level or extent of difference between corresponding portions of the frame pair. An example of training data can include the frame pair and an associated difference map. Many variations in the generation of training data to train the model 306 are possible.

The detection of changes, including anomalous objects or events, associated with a segment of a road can be based on determined differences. In some embodiments, the detection module 304 can apply a selected first threshold level of difference to difference maps generated by the model 306. The detection module 304 can identify from the difference map those differences with magnitudes that satisfy the first threshold level of difference. The detection module 304 can determine that the differences that satisfy the first threshold level of difference constitute or indicate detected changes that potentially warrant provision of navigation guidance to vehicles. The detected changes can be changes in a state or a condition of the segment of the road corresponding to the infrastructure pod that captured sensor data including the input sequence of frames provided to the model 302 and the ground truth sequence of frames provided to the model 306. As mentioned, detected changes, including anomalous objects and events, can include, for example, debris, erratic vehicle movement, a running animal, an accident, a pothole, a faded or absent lane marking, extreme weather conditions, uncommon traffic dynamics, and the like. In some instances, upon determination of a detected change, the detection module 304 can tag, label, or otherwise indicate the detected change and its location in subsequent frames of sensor data. The indication of the detected change can persist in subsequent frames of sensor data until the change is no longer detected. Based on the location of the detected change in the difference map, the detection module 304 can determine the location of the detected change in one or more frames of sensor data capturing the segment of the road. The detection module 304 then can localize the detected change in a map maintained by the infrastructure system that includes the segment of the road. Detection of changes in accordance with present technology thus does not require a machine learning model to be trained with training data that specifically includes or depicts the precise changes to be detected. As a result, the present technology can detect a wide variety of objects or events, including rare or uncommon objects and events, that are beyond the detection and recognition capabilities of conventional machine learning models. In some embodiments, a detected change determined by the detection module 304 can be provided to a central control to classify or recognize the detected change.

The detection module 304 can provide navigation guidance about a detected change to vehicles subscribed to the infrastructure system. For example, vehicles currently in the segment of the road in which the detected change has been determined can receive navigation guidance. As another example, the infrastructure system can provide navigation guidance to vehicles in other segments of the road that are approaching or otherwise will be impacted by detected change. The navigation guidance can support safe and efficient navigation of vehicles in response to the detected change. For example, the navigation guidance can describe attributes of the detected change including the location of the detected change on the road with respect to the map maintained by the infrastructure system. As another example, the navigation guidance can include navigation advice to perform a certain maneuver (e.g., lane change, slow down, speed up, stop) in response to the detected change. Upon receipt of the navigation guidance, a vehicle with access to the map can appropriately plan navigation in response to the detected change. For example, based on receipt of the location of the detected change, the vehicle can plan navigation, such as one or more lane changes, to avoid the location of the detected change. As another example, based on a suggestion (e.g., recommended maneuver) in the navigation guidance, a vehicle can follow the suggestion, discard the suggestion, or wait before performing or discarding the suggestion.

In some embodiments, the detection module 304 can apply the first threshold level of difference or a selected second threshold level of difference to identify differences from difference maps generated by the model 306. For example, the second threshold level of difference can be less than the first threshold level of difference. A difference that satisfies the second threshold level of difference can be identified as a detected change that warrants further analysis or consideration to determine if the detected change is material to vehicle navigation or not. The detected change and associated pixel data as well as location data associated with the detected change can be provided from the detection module 304 to a central control. The central control can identify, analyze, or classify the detected changed. In addition, the central control can determine whether navigation guidance is warranted in response to the detected change. If navigation guidance is warranted, the central control can determine the navigation guidance and cause the navigation guidance to be provided to vehicles impacted or potentially impacted by the detected change.

Figure 4A:
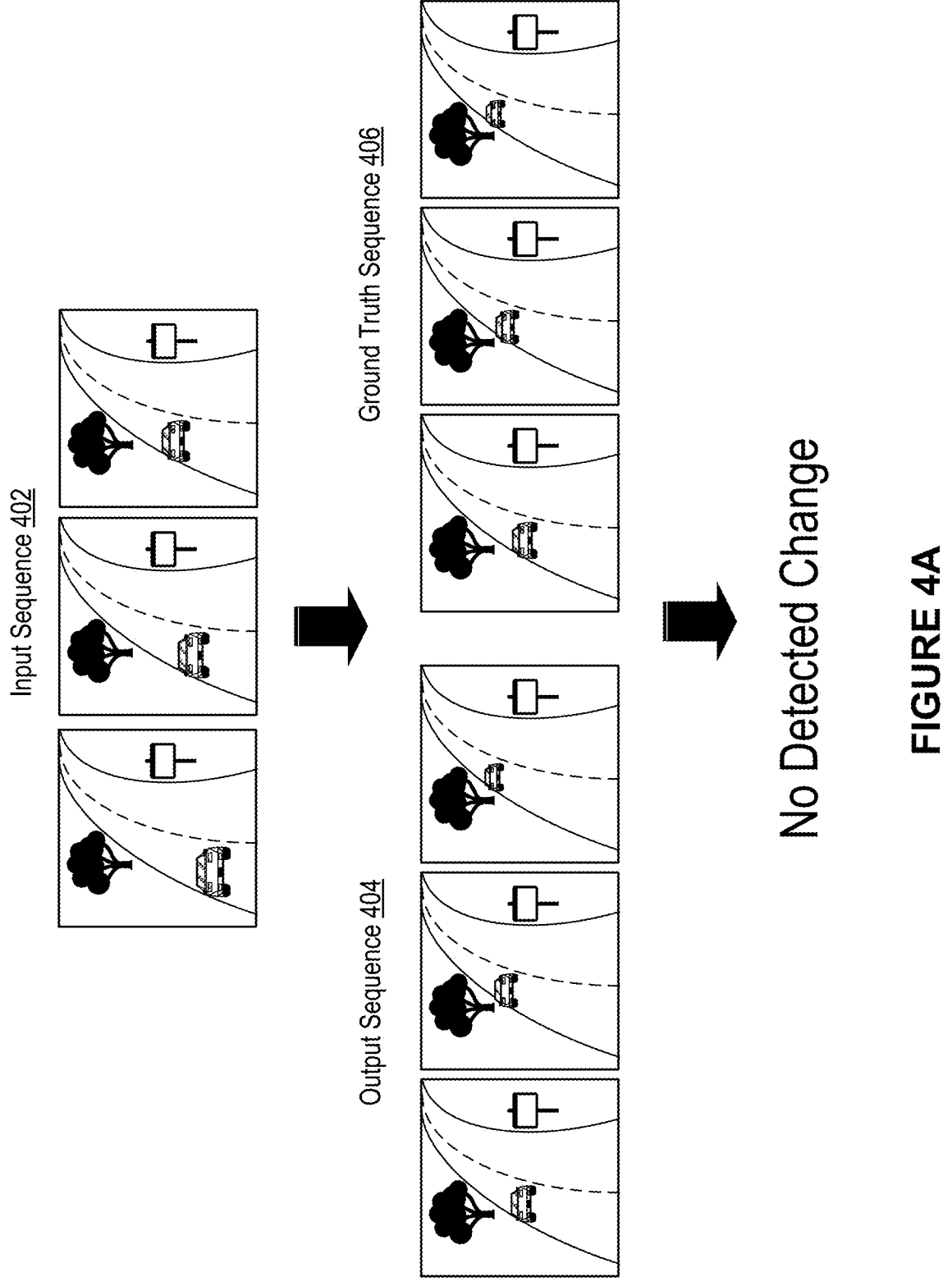
FIGS. 4A-4B illustrate frames of captured sensor data and frames of generated sensor data utilized in a change detection system, according to embodiments of the present technology.
Figure 4B:
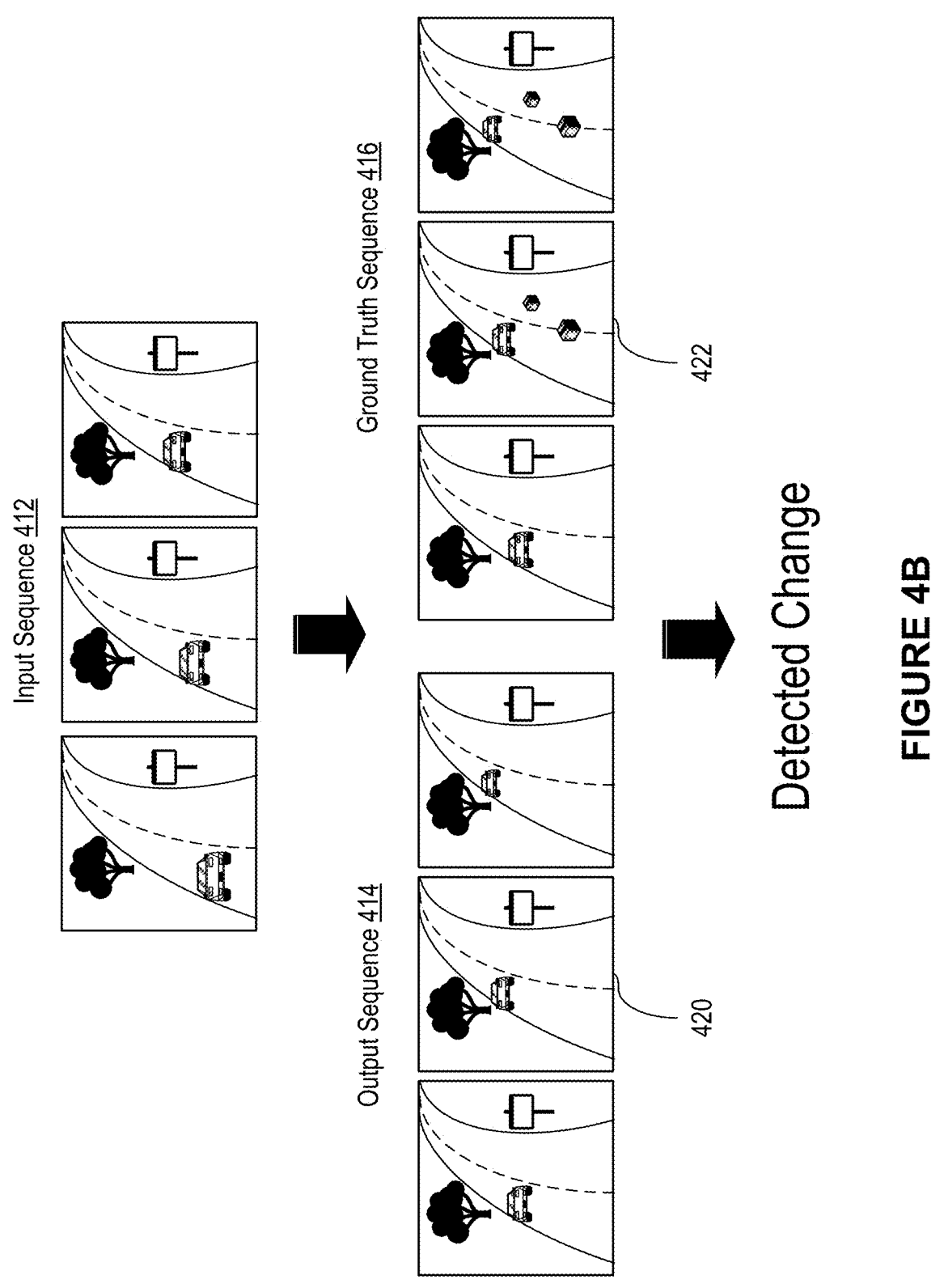

FIGS. 4A-4B illustrate frames of captured sensor data and frames of generated sensor data utilized in a change detection system, according to some embodiments of the present technology. In some embodiments, the change detection system can be the change detection system 350. Based on sensor data capturing a segment of a road serviced by an infrastructure system, the change detection system in real time (or near real time) can detect the potential existence of changes in status or conditions of the segment of the road. As shown in FIG. 4A, an input sequence 402 of sensor data associated with a first time window can be provided to the change detection system. Based on the input sequence 402, the change detection system can generate an output sequence 404 associated with a second time window following the first time window. A ground truth sequence 406 of sensor data associated with the second time window can be provided to the change detection system. The change detection system can determine the potential existence of differences between corresponding frames of the output sequence 404 and the ground truth sequence 406. When no differences are detected or when a detected difference does not satisfy a selected threshold level, the change detection system can determine the absence of material change in relation to the segment of the road, as indicated in FIG. 4A.

As shown in FIG. 4B, an input sequence 412 of sensor data associated with a first time window can be provided to the change detection system. Based on the input sequence 412, the change detection system can generate an output sequence 414 associated with a second time window following the first time window. A ground truth sequence 416 of sensor data associated with the second time window can be provided to the change detection system. The change detection system can determine the potential existence of differences between corresponding frames of the output sequence 414 and the ground truth sequence 416. When a difference is determined or when a difference satisfies the selected threshold level, the change detection system can detect the presence of a material change in relation to the segment of the road, as indicated in FIG. 4B. As illustrated, a difference can be determined by comparison of a frame pair of a frame 420 of the output sequence 414 and a frame 422 of the ground truth sequence 416. Upon determination of the difference, a change, such as an anomalous object or event, can be detected in relation to the segment of the road and the location of the change can be determined. Subsequent frames of sensor data can be annotated to reflect the detected change.

Figure 5A:
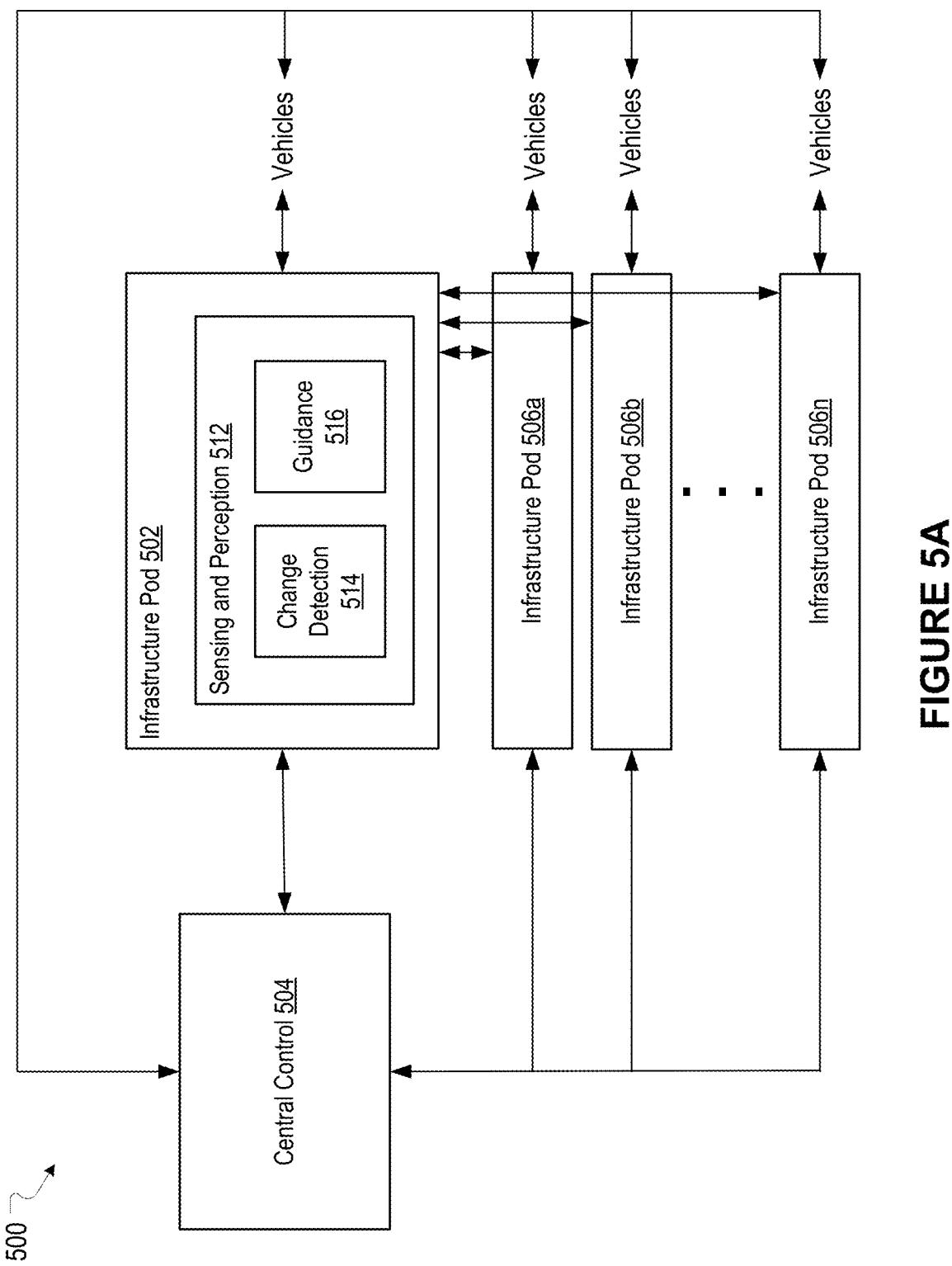
FIGS. 5A-5B illustrate example implementations of a change detection system in an infrastructure system, according to embodiments of the present technology.
Figure 5B:
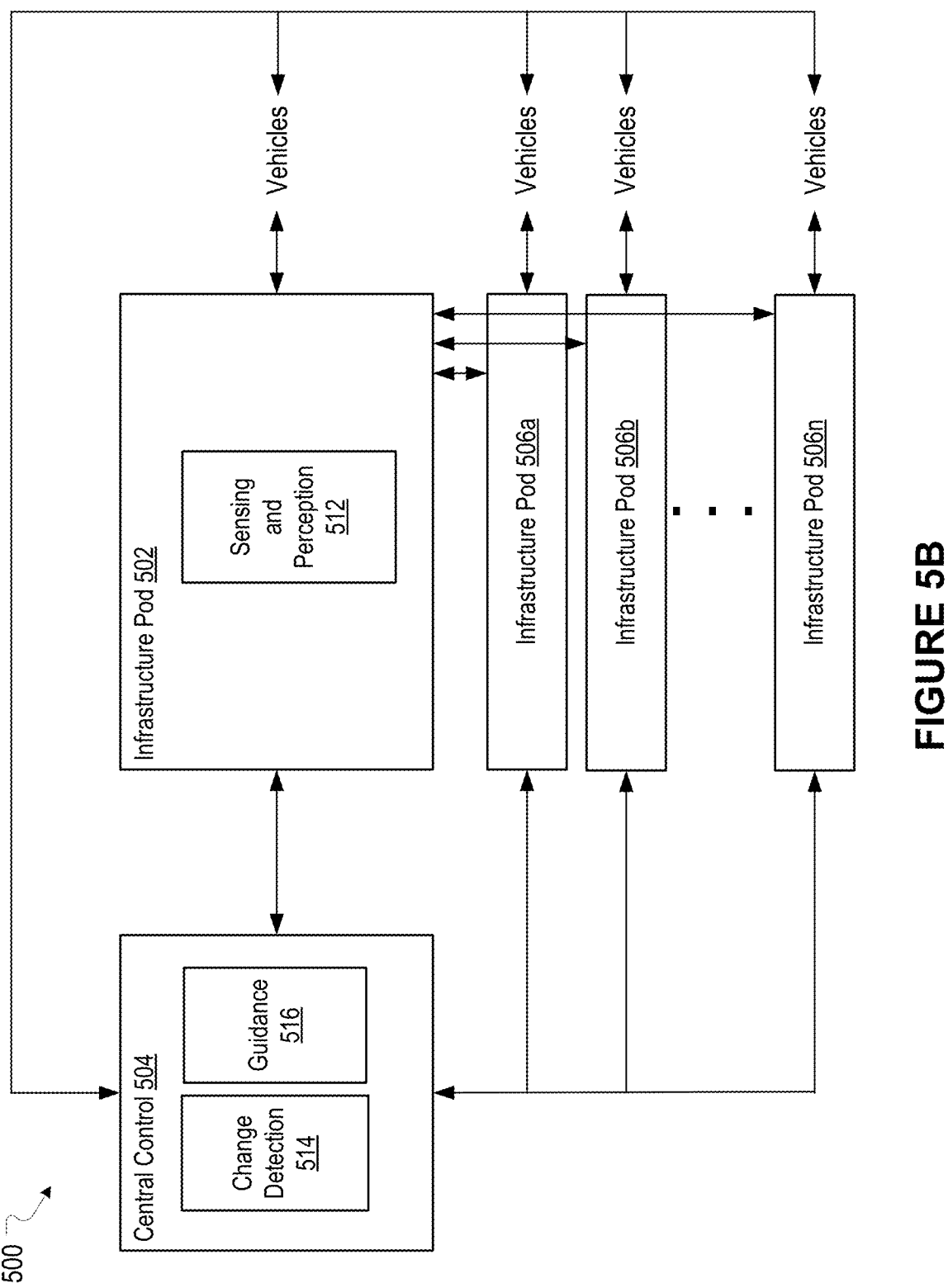

FIGS. 5A-5B illustrate example implementations of a change detection system in an infrastructure system 500, according to some embodiments of the present technology. In some embodiments, the infrastructure system 500 can be the infrastructure system 100. The infrastructure system 500 can include a plurality of infrastructure pods for monitoring an environment, such as various respective segments of a road serviced by the infrastructure system 500. The infrastructure system 500 can include an infrastructure pod 502 and infrastructure pods 506a-n. The infrastructure system 500 also can include a central control 504. For purposes of illustration, a change detection system is discussed in relation to the infrastructure pod 502 and the central control 504. The design and operation of the infrastructure pods 506a-n can be substantially similar to the design and operation of the infrastructure pod 502. In some embodiments, the functionality of the change detection system can be similar to or the same as the functionality of the change detection system 350. As shown in FIG. 5A, the infrastructure pod 502 can include sensing and perception 512. The sensing and perception 512 can include change detection 514 and guidance 516. In some embodiments, the sensing and perception 512, including the change detection 514 and the guidance 516, can be functionality to implement, or functionality implemented by, the computation system 122 of the infrastructure pod 104. As mentioned, the components of the infrastructure pod 502 can vary, and other functionality of the infrastructure pod 502 is not illustrated for purposes of clarity. The sensing and perception 512 can perform various tasks associated with the capture and analysis of various types of sensor data, as discussed herein. The change detection 514 can perform the functionality of the change detection system, as discussed herein. Based on determinations of the change detection 514, the guidance 516 as warranted can provide navigation guidance to vehicles on a segment of the road associated with the infrastructure pod 502, as discussed herein. Thus, in the implementation shown in FIG. 5A, detection of a change and related provision of navigation guidance can be performed by the infrastructure pod 502. As shown, navigation guidance also can be provided to the infrastructure pods 506a-n and to the central control 504 so that vehicles in other segments of the road can be appropriately informed and advised about a detected change.

In some embodiments, as shown in FIG. 5B, the infrastructure pod 502 can include the sensing and perception 512 while the central control 504 can include the change detection 514 and the guidance 516. Thus, in the implementation shown in FIG. 5B, detection of a change and related provision of navigation guidance can be performed by the central control 504 instead of (or in addition to) the infrastructure pod 502. As shown, the navigation guidance can be provided by the central control 504 directly, or indirectly through the infrastructure pods, to the vehicles travelling along segments of the road associated with the infrastructure pod 502 and the infrastructure pods 506a-n.

FIG. 6 illustrates an example method 600, according to embodiments of the present technology. At block 602, the method 600 can capture a first sequence of captured data associated with a first time window. At block 604, the method 600 can generate a second sequence of generated data associated with a second time window based on the first sequence of data. At block 606, the method 600 can identify a difference between the second sequence of generated data and a ground truth sequence of captured data associated with the second time window. At block 608, the method 600 can determine whether the difference between the second sequence of generated data and the ground truth sequence of captured data satisfies a selected threshold value. At block 610, the method 600 can detect a change associated with an environment when the difference between the second sequence of generated data and the ground truth sequence of captured data satisfies the selected threshold value. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

FIG. 7 illustrates a vehicle 700 including a system 710, according to various embodiments of the present technology. The system 710 can be or include an autonomous, automated or assistance system. The functionality and operation of the present technology, including the system 710, can be implemented in whole or in part by the vehicle 700. The present technology can cause desired control and navigation of the vehicle 700, as described herein. In some embodiments, the vehicle 700 is a passenger vehicle, light commercial vehicle, truck (which can include a trailer), or any other type of motorized transport. The truck can be of any size (e.g., medium truck, heavy truck, very heavy truck, etc.) or weight (e.g., greater than 14,000 pounds, greater than 26,000 pounds, greater than 70,000 pounds, etc.). The system 710 of the vehicle 700 can support and execute various modes of navigation of the vehicle 700. The system 710 can support and execute an autonomous driving mode, a semi-autonomous driving mode, and a driver assisted driving mode of the vehicle 700. The system 710 also can enable a manual driving mode. For operation of the vehicle 700, the system 710 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the system 710 can include, for example, a perception module 712, a localization module 714, a prediction and planning module 716, and a control module 718. The functionality of the perception module 712, the localization module 714, the prediction and planning module 716, and the control module 718 of the system 710 are described in brief for purposes of illustration. As mentioned, the components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 710 can be implemented in any suitable combinations.

The perception module 712 can receive and analyze various types of data about an environment in which the vehicle 700 is located. Through analysis of the various types of data, the perception module 712 can perceive the environment of the vehicle 700 and provide the vehicle 700 with critical information so that planning of navigation of the vehicle 700 is safe and effective. For example, the perception module 712 can determine the pose, trajectories, size, shape, and type of obstacles in the environment of the vehicle 700. Various models, such as machine learning models, can be utilized in such determinations.

The various types of data received by the perception module 712 can be any data that is supportive of the functionality and operation of the present technology. For example, the data can be attributes of the vehicle 700, such as location, velocity, acceleration, weight, and height of the vehicle 700. As another example, the data can relate to topographical features in the environment of the vehicle 700, such as traffic lights, road signs, lane markers, landmarks, buildings, structures, trees, curbs, bodies of water, etc. As yet another example, the data can be attributes of dynamic obstacles in the surroundings of the vehicle 700, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 700 to optimize the collection of data. The data also can be captured by sensors that are not mounted on or in the vehicle 700, such as data captured by another vehicle (e.g., another truck) or by non-vehicular sensors located in the environment of the vehicle 700.

The localization module 714 can determine the pose of the vehicle 700. Pose of the vehicle 700 can be determined in relation to a map of an environment in which the vehicle 700 is travelling. Based on data received by the vehicle 700, the localization module 714 can determine distances and directions of features in the environment of the vehicle 700. The localization module 714 can compare features detected in the data with features in a map (e.g., HD map) to determine the pose of the vehicle 700 in relation to the map. The features in the map can include, for example, traffic lights, crosswalks, road signs, lanes, road connections, stop lines, etc. The localization module 714 can allow the vehicle

700 to determine its location with a high level of precision that supports optimal navigation of the vehicle 700 through the environment.

The prediction and planning module 716 can plan motion of the vehicle 700 from a start location to a destination location. The prediction and planning module 716 can generate a route plan, which reflects high level objectives, such as selection of different roads to travel from the start location to the destination location. The prediction and planning module 716 also can generate a behavioral plan with more local focus. For example, a behavioral plan can relate to various actions, such as changing lanes, merging onto an exit lane, turning left, passing another vehicle, etc. In addition, the prediction and planning module 716 can generate a motion plan for the vehicle 800 that navigates the vehicle 700 in relation to the predicted location and movement of other obstacles so that collisions are avoided. The prediction and planning module 716 can perform its planning operations subject to certain constraints. The constraints can be, for example, to ensure safety, to minimize costs, and to enhance comfort. In some embodiments, an infrastructure system that services a road on which the vehicle 700 is travelling can generate or determine various types of data, such as data relating to objects and events in a segment of the road in which the vehicle 700 is positioned. For example, the data can include detection of changes, including the occurrence of anomalous objects and events, as well as related navigation guidance. To enhance safety and navigation of the vehicle 700, the data can be provided to the vehicle 700 to be considered alongside or fused with (or replace) data generated or determined by the perception module 712, the localization module 714, and the prediction and planning module 716 of the vehicle 700.

Based on output from the prediction and planning module 716, the control module 718 can generate control signals that can be communicated to different parts of the vehicle 700 to implement planned vehicle movement. The control module 718 can provide control signals as commands to actuator subsystems of the vehicle 700 to generate desired movement. The actuator subsystems can perform various functions of the vehicle 700, such as braking, acceleration, steering, signaling, etc.

The system 710 can include a data store 720. The data store 720 can be configured to store and maintain information that supports and enables operation of the vehicle 700 and functionality of the system 710. The information can include, for example, instructions to perform the functionality of the system 710, data captured by sensors, data received from a remote computing system, parameter values reflecting vehicle states, map data, machine learning models, algorithms, vehicle operation rules and constraints, navigation plans, etc.

The system 710 of the vehicle 700 can communicate over a communications network with other computing systems to support navigation of the vehicle 700. The communications network can be any suitable network (e.g., wireless, over the air, wired, etc.) through which data can be transferred between computing systems. Communications over the communications network involving the vehicle 700 can be performed in real time (or near real time) to support navigation of the vehicle 700.

The system 710 can communicate with a remote computing system (e.g., server, server farm, peer computing system) over the communications network. The remote computing system can include an autonomous, automated, or assistance system and perform some or all of the functionality of the system 710. In some embodiments, the functionality of the system 710 can be distributed between the vehicle 700 and the remote computing system to support navigation of the vehicle 700. For example, some functionality of the system 710 can be performed by the remote computing system and other functionality of the system 710 can be performed by the vehicle 700. In some embodiments, a fleet of vehicles including the vehicle 700 can communicate data captured by the fleet to a remote computing system controlled by a provider of fleet management services. The remote computing system in turn can aggregate and process the data captured by the fleet. The processed data can be selectively communicated to the fleet, including vehicle 700, to assist in navigation of the fleet as well as the vehicle 700 in particular. In some embodiments, the system 710 of the vehicle 700 can directly communicate with a remote computing system of another vehicle. For example, data captured by the other vehicle can be provided to the vehicle 700 to support navigation of the vehicle 700, and vice versa. The vehicle 700 and the other vehicle can be owned by the same entity in some instances. In other instances, the vehicle 700 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 8:
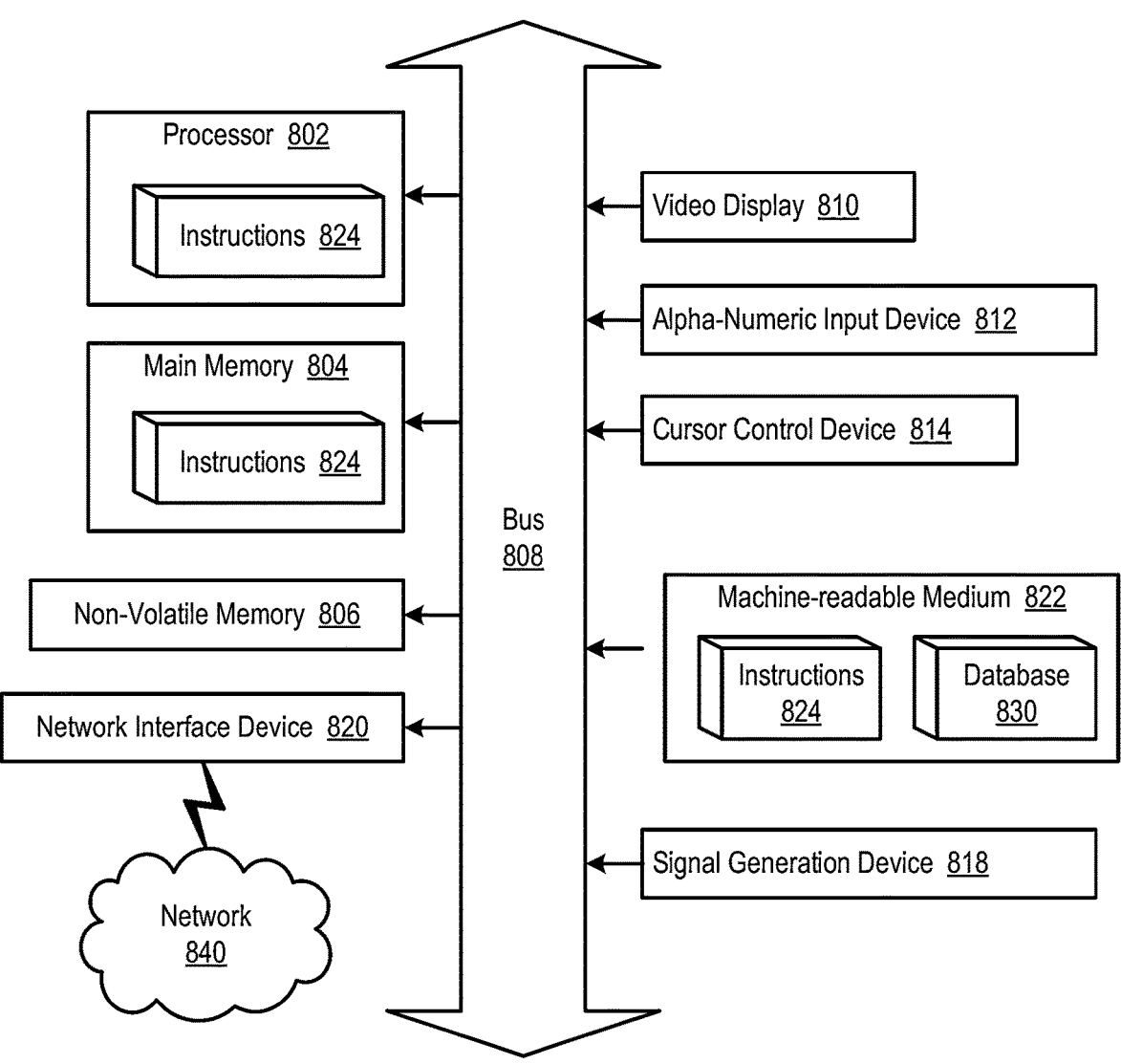
FIG. 8 illustrates an example computing system, according to embodiments of the present technology.

FIG. 8 illustrates an example of a computer system 800 that may be used to implement one or more of the embodiments of the present technology. The computer system 800 can be included in a wide variety of local and remote machine and computer system architectures and in a wide variety of network and computing environments that can implement the functionalities of the present technology. The computer system 800 includes sets of instructions 824 for causing the computer system 800 to perform the functionality, features, and operations discussed herein. The computer system 800 may be connected (e.g., networked) to other machines and/or computer systems. In a networked deployment, the computer system 800 may operate in the capacity of a server or a client machine in a client-server network environment, or as a peer machine in a peer-to-peer (or distributed) network environment. One or more features or components of the computer system 800 as described herein can be omitted in various embodiments.

The computer system 800 includes a processor 802 (e.g., a central processing unit (CPU), a graphics processing unit (GPU), or both), a main memory 804, and a nonvolatile memory 806 (e.g., volatile RAM and non-volatile RAM, respectively), which communicate with each other via a bus 808. In some embodiments, the computer system 800 can be a desktop computer, a laptop computer, personal digital assistant (PDA), or mobile phone, for example. In one embodiment, the computer system 800 also includes a video display 810, an alphanumeric input device 812 (e.g., a keyboard), a cursor control device 814 (e.g., a mouse), a signal generation device 818 (e.g., a speaker) and a network interface device 820.

In one embodiment, the video display 810 includes a touch sensitive screen for user input. In one embodiment, the touch sensitive screen is used instead of a keyboard and mouse. A machine-readable medium 822 can store one or more sets of instructions 824 (e.g., software) embodying any one or more of the methodologies, functions, or operations described herein. The instructions 824 can also reside, completely or at least partially, within the main memory 804 and/or within the processor 802 during execution thereof by the computer system 800. The instructions 824 can further be transmitted or received over a network 840 via the network interface device 820. In some embodiments, the machine-readable medium 822 also includes a database 830.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 806 may also be a random access memory. The non-volatile memory 806 can be a local device coupled directly to the rest of the components in the computer system 800. A non-volatile memory that is remote from the system, such as a network storage device coupled to any of the computer systems described herein through a network interface such as a modem or Ethernet interface, can also be used.

While the machine-readable medium 822 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks.

Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:

capturing, by a computing system, a first sequence of captured data associated with a first time window, wherein the first sequence of captured data includes image data;

generating, by the computing system, a second sequence of generated data associated with a second time window based on the first sequence of data, wherein the generating is performed by an infrastructure pod associated with a segment of an environment;

identifying, by the computing system, a difference between the second sequence of generated data and a ground truth sequence of captured data associated with the second time window, wherein the difference between the second sequence of generated data and the ground truth sequence of captured data is associated with pixel data;

determining, by the computing system, whether the difference between the second sequence of generated data and the ground truth sequence of captured data satisfies a selected threshold value;

detecting, by the computing system, a change associated with an environment when the difference between the second sequence of generated data and the ground truth sequence of captured data satisfies the selected threshold value, the detected change relating to appearance of an object in the environment; and based on the detected change, providing, by the computing system, navigation guidance to a vehicle travelling in the environment.

2. The computer-implemented method of claim 1, wherein the ground truth sequence of captured data associated with the second time window follows the first sequence of captured data associated with the first time window in a sequence of sensor data capturing a segment of an environment for which an infrastructure system provides services.

3. The computer-implemented method of claim 1, wherein the navigation guidance comprises at least one of i) a location of the detected change and ii) a suggestion to perform a navigation maneuver in response to the detected change.

4. The computer-implemented method of claim 1, wherein the detected change is an object or event associated with a frequency of appearance that is less than a selected threshold frequency value.

5. The computer-implemented method of claim 1, wherein the generating is performed by a sequence to sequence neural network.

6. The computer-implemented method of claim 5, further comprising:

training, by the computing system, the sequence to sequence neural network based on training data to remove an object or event from sequences of generated data outputted by the sequence to sequence neural network.

7. The computer-implemented method of claim 1, wherein the identifying is based on a difference map generated by a machine learning model that reflects differences associated with frame pairs from two sequences of data.

8. The computer-implemented method of claim 1, wherein the first sequence of captured data associated with the first window of time is a first number of frames of sensor data captured by an infrastructure system providing service to vehicles travelling in an environment, and the second sequence of generated data and the ground truth sequence of captured data are a second number of frames that is different from the first number of frames.

9. A system comprising:

at least one processor; and a memory storing instructions that, when executed by the at least one processor, cause the system to perform operations comprising:

capturing a first sequence of captured data associated with a first time window, wherein the first sequence of captured data includes image data;

generating a second sequence of generated data associated with a second time window based on the first sequence of data, wherein the generating is performed by an infrastructure pod associated with a segment of an environment;

identifying a difference between the second sequence of generated data and a ground truth sequence of captured data associated with the second time window, wherein the difference between the second sequence of generated data and the ground truth sequence of captured data is associated with pixel data;

determining whether the difference between the second sequence of generated data and the ground truth sequence of captured data satisfies a selected threshold value;

detecting a change associated with an environment when the difference between the second sequence of generated data and the ground truth sequence of captured data satisfies the selected threshold value, the detected change relating to appearance of an object in the environment; and based on the detected change, providing navigation guidance to a vehicle travelling in the environment.

10. The system of claim 9, wherein the ground truth sequence of captured data associated with the second time window follows the first sequence of captured data associated with the first time window in a sequence of sensor data capturing a segment of an environment for which an infrastructure system provides services.

11. The system of claim 9, wherein the navigation guidance comprises at least one of i) a location of the detected change and ii) a suggestion to perform a navigation maneuver in response to the detected change.

12. The system of claim 9, wherein the detected change is an object or event associated with a frequency of appearance that is less than a selected threshold frequency value.

13. A non-transitory computer-readable storage medium including instructions that, when executed by at least one processor of a computing system, cause the computing system to perform operations comprising:

capturing a first sequence of captured data associated with a first time window, wherein the first sequence of captured data includes image data;

generating a second sequence of generated data associated with a second time window based on the first sequence of data, wherein the generating is performed by an infrastructure pod associated with a segment of an environment;

identifying a difference between the second sequence of generated data and a ground truth sequence of captured data associated with the second time window, wherein the difference between the second sequence of generated data and the ground truth sequence of captured data is associated with pixel data;

determining whether the difference between the second sequence of generated data and the ground truth sequence of captured data satisfies a selected threshold value;

detecting a change associated with an environment when the difference between the second sequence of generated data and the ground truth sequence of captured data satisfies the selected threshold value, the detected change relating to appearance of an object in the environment; and based on the detected change, providing navigation guidance to a vehicle travelling in the environment.

14. The non-transitory computer-readable storage medium of claim 13, wherein the ground truth sequence of captured data associated with the second time window follows the first sequence of captured data associated with the first time window in a sequence of sensor data capturing a segment of an environment for which an infrastructure system provides services.

15. The non-transitory computer-readable storage medium of claim 13, wherein the operations further comprise:

based on the detected change, providing navigation guidance to a vehicle travelling in the environment, the navigation guidance comprising at least one of i) a location of the detected change and ii) a suggestion to perform a navigation maneuver in response to the detected change.

16. The non-transitory computer-readable storage medium of claim 13, wherein the detected change is an object or event associated with a frequency of appearance that is less than a selected threshold frequency value.

17. The computer-implemented method of claim 1, wherein the difference between the second sequence of generated data and the ground truth sequence of captured data is reflected in a difference map between a corresponding pair of frames, the detected object in the environment indicated based on differences of the difference map satisfying a threshold level of difference.

18. The system of claim 9, wherein the difference between the second sequence of generated data and the ground truth sequence of captured data is reflected in a difference map between a corresponding pair of frames, the detected object in the environment indicated based on differences of the difference map satisfying a threshold level of difference.

19. The non-transitory computer-readable storage medium of claim 13, wherein the difference between the second sequence of generated data and the ground truth sequence of captured data is reflected in a difference map between a corresponding pair of frames, the detected object in the environment indicated based on differences of the difference map satisfying a threshold level of difference.

20. The computer-implemented method of claim 1, wherein the infrastructure pod is included in an infrastructure system associated with a plurality of infrastructure pods associated with a plurality of segments of the environment.

* * * * *